Figure 1:
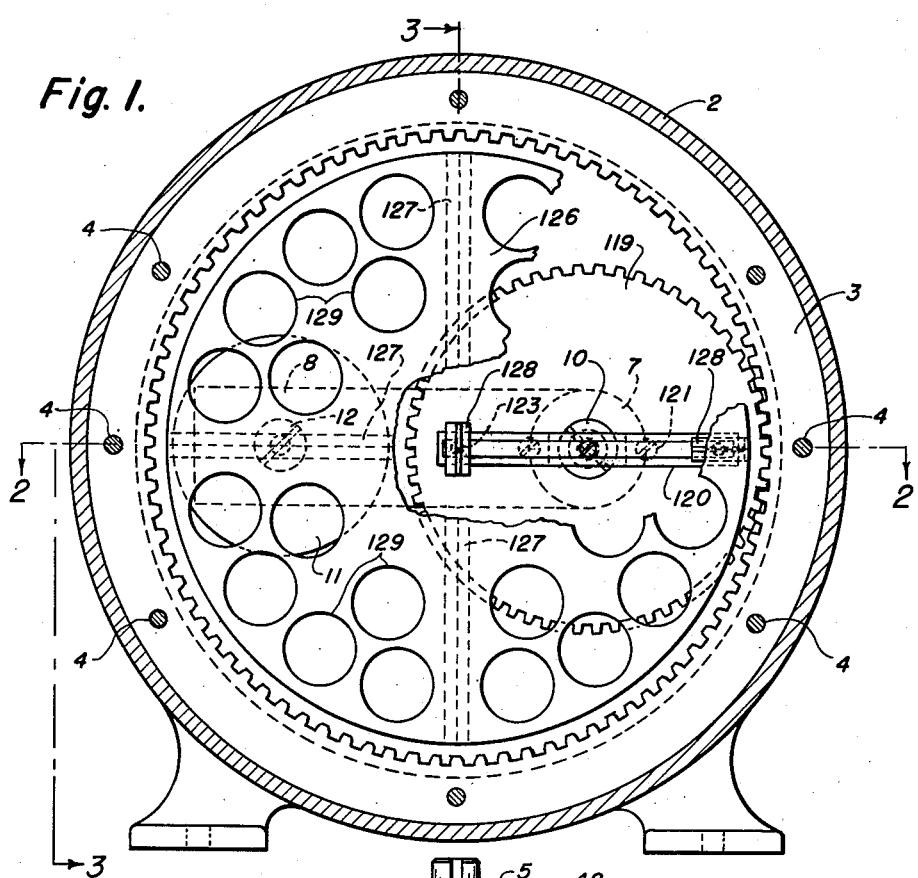

Nov. 25, 1952 E. T. OLIVER 2,618,984
TRANSLATING APPARATUS
Filed July 21, 1951 11 Sheets-Sheet 1

Inventor
Emerson T. Oliver
by Reese and Reese
Attorneys

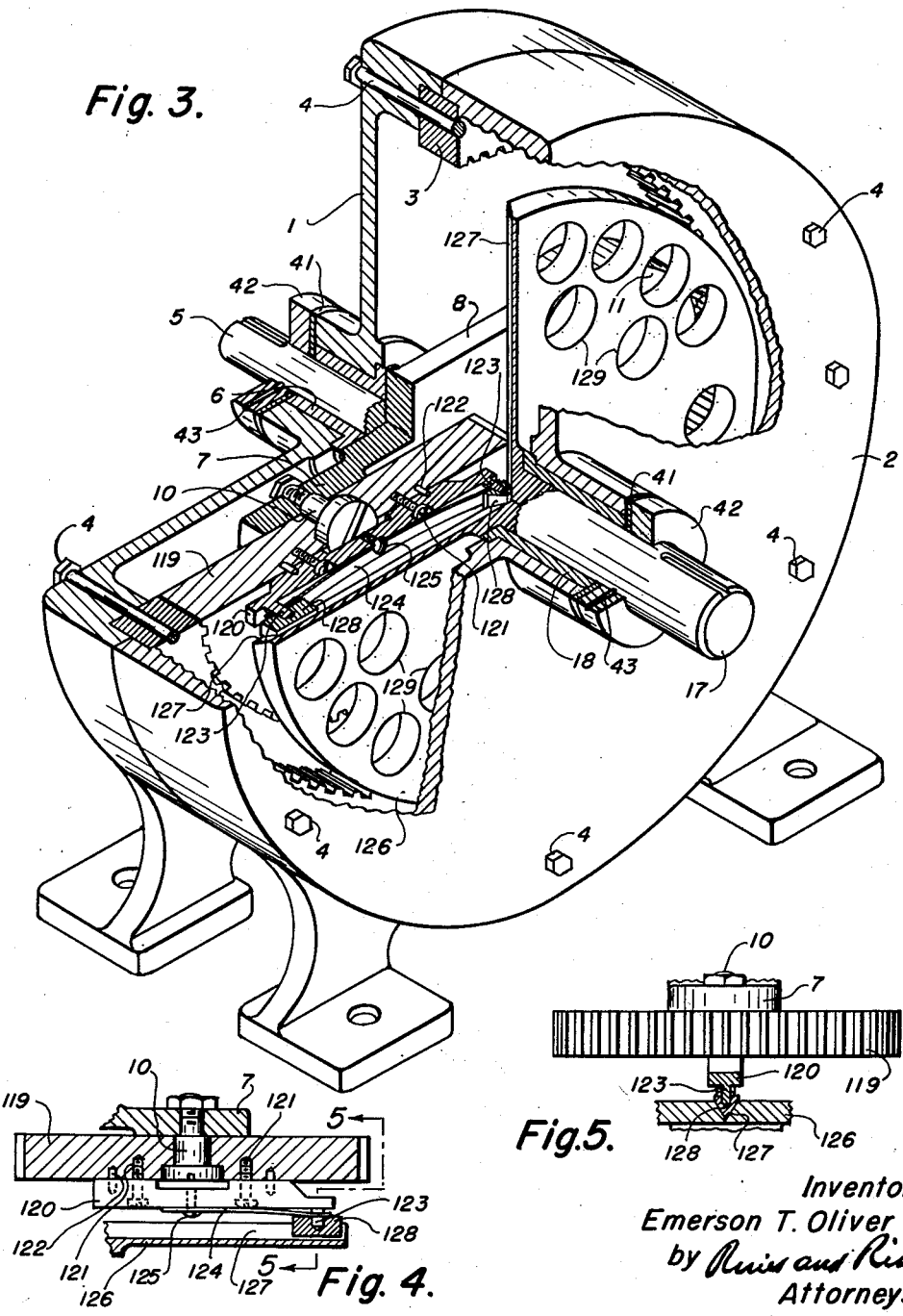

Inventor
Emerson T. Oliver
by Rines and Rines
Attorneys

Nov. 25, 1952  E. T. OLIVER  2,618,984
TRANSLATING APPARATUS
Filed July 21, 1951  11 Sheets-Sheet 4

$$\omega = \frac{2r-R}{2r}\theta$$

$$\omega = \frac{S}{2r}\theta$$

Inventor
Emerson T. Oliver
by Rines and Rines
Attorneys

Nov. 25, 1952            E. T. OLIVER            2,618,984

TRANSLATING APPARATUS

Filed July 21, 1951            11 Sheets-Sheet 5

Inventor
Emerson T. Oliver
by Ruies and Ruies
Attorneys

Nov. 25, 1952     E. T. OLIVER     2,618,984
TRANSLATING APPARATUS

Filed July 21, 1951     11 Sheets-Sheet 6

Inventor
Emerson T. Oliver
by Rines and Rines
Attorneys

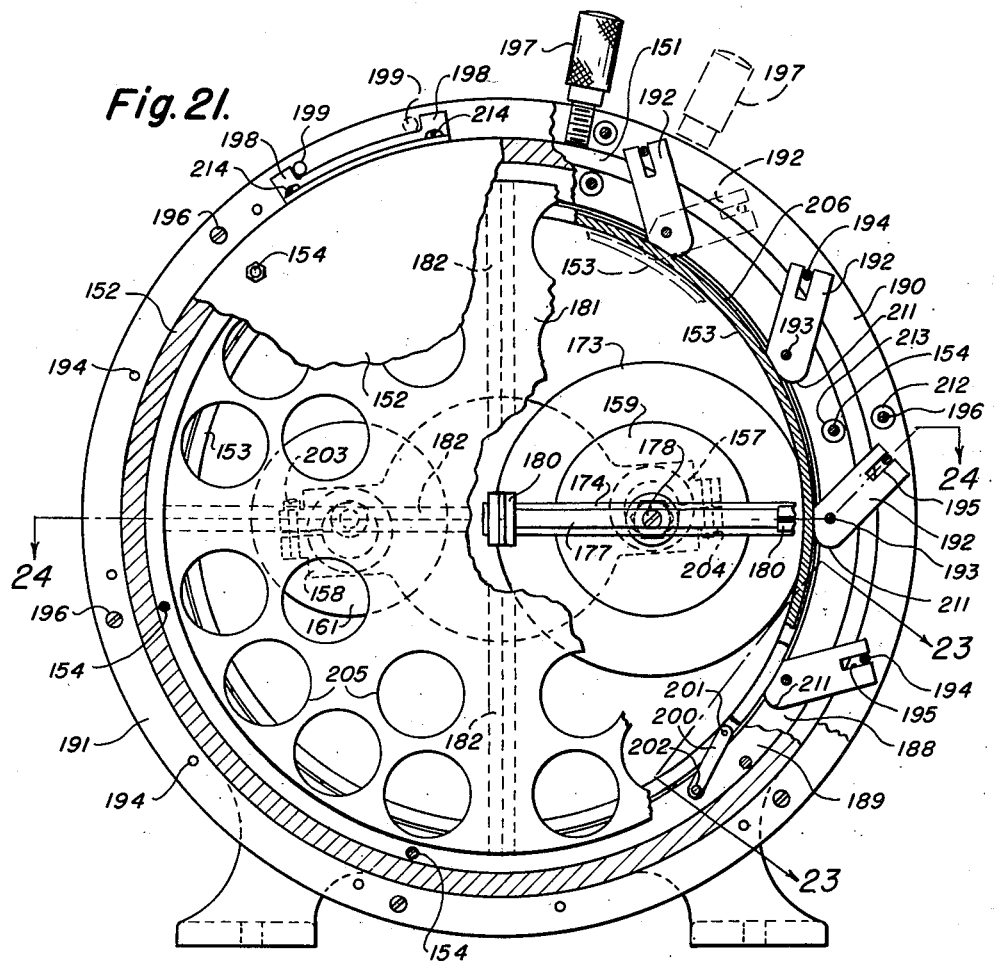

Nov. 25, 1952 — E. T. OLIVER — 2,618,984

TRANSLATING APPARATUS

Filed July 21, 1951 — 11 Sheets-Sheet 8

Inventor
Emerson T. Oliver
by Rines and Rines
Attorneys

Nov. 25, 1952   E. T. OLIVER   2,618,984
TRANSLATING APPARATUS
Filed July 21, 1951   11 Sheets-Sheet 9

Inventor
Emerson T. Oliver
by Rines and Rines
Attorneys

Nov. 25, 1952 E. T. OLIVER 2,618,984
TRANSLATING APPARATUS
Filed July 21, 1951 11 Sheets-Sheet 10

Inventor
Emerson T. Oliver
by Ries and Ries
Attorneys

Patented Nov. 25, 1952

2,618,984

UNITED STATES PATENT OFFICE 2,618,984

TRANSLATING APPARATUS

Emerson T. Oliver, Marblehead, Mass.

Application July 21, 1951, Serial No. 237,889

51 Claims. (Cl. 74—394)

The present invention relates to translating apparatus, and more particularly to apparatus for increasing and decreasing speed. From a more specific aspect, the invention relates to apparatus for transmitting power from a high-speed to a low-speed or from a low-speed to a high-speed shaft. This application is a continuation-in-part of application, Serial No. 752,703, filed June 5, 1947.

An object of the invention is to provide a new and improved translating apparatus for effecting speed variation between alined high-speed and low-speed shafts.

Another object is to provide a new and improved speed reducer.

A further object is to provide a new and improved speed-increasing mechanism.

Other and further objects will be explained hereinafter and will be more particularly pointed out in the appended claims.

One of the alined high-speed and low-speed shafts may be regarded as the control shaft and the other as the controlled shaft. In the case of speed reduction, for example, the high-speed shaft may be regarded as the control shaft and the low-speed as the controlled shaft. In the case of speed increase, on the other hand, the low-speed shaft may be regarded as the control shaft and the high-speed shaft as the controlled shaft.

The invention comprises meshing circular gears one of which, concentric with the common axis of the alined shafts, is stationary, and the other of which is fixed to the control shaft in order that it may travel in a circular orbit about the common axis of the alined shafts. This other member may therefore be referred to as a control member. A third member, which may be referred to as the controlled member, is fixed to the controlled shaft. If the control member is fixed to the high-speed shaft, for example, the controlled member is fixed to the low-speed shaft; and if the control member is fixed to the low-speed shaft, the controlled member is fixed to the high-speed shaft. During its travel in the said orbit, the control member rotates about its own axis, thus maintaining its circular periphery in engagement with the circular periphery of the concentrically disposed member.

The control member is provided with a projection which therefore describes a hypotrochoidal or epitrochoidal path intersecting the common axis of the alined shafts. Whether the path is hypotrochoidal or epitrochoidal depends upon whether the fixed projection is inside or outside the circumference of the control member to which it is fixed. This projection, which may be referred to as a control projection, because it is part of the control member, is slidably connected to the controlled member that is fixed to the controlled shaft.

The controlled member is provided with a straight guide slot that is symmetrically disposed with respect to the common axis of the alined shafts, so that the center of the guide slot is disposed on the common axis of the alined shafts. The slidable connection of the control projection to the controlled member is brought about by slidably mounting the control projection in the guide slot. The control projection therefore oscillates back and forth in the guide slot along its hypotrochoidal or epitrochoidal path, passing through the center of the guide slot each time that it oscillates from one end of the guide slot to the other end. The control member thus maintains control over the controlled member through the engagement of the control projection with the walls of the guide slot.

At the moment when it passes through the center of the guide slot, however, the control projection occupies a position of dead center. In order that, in this position of dead center, the control projection shall not lose its control over the controlled member, it is preferred to employ two such control projections, respectively mounted in two straight guide slots of the above-described character, these guide slots being disposed at right angles to each other. The invention may, however, be employed with only one such control projection or with more than two such control projections.

Another object of the present invention is to vary the speed reduction or increase. To the attainment of this end, a feature of the invention resides in adjusting the length of the circumference of one or the other of the circular gears, or both. According to a further feature of the invention, as herein illustrated and described, this adjustment may be effected at will, during the operation of the machine.

Figure 2:
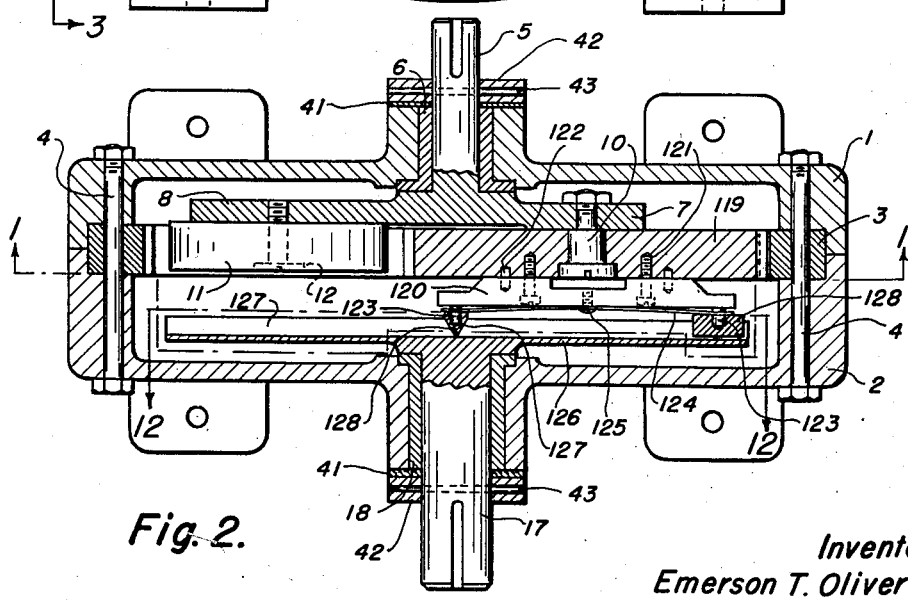
Figure 6:
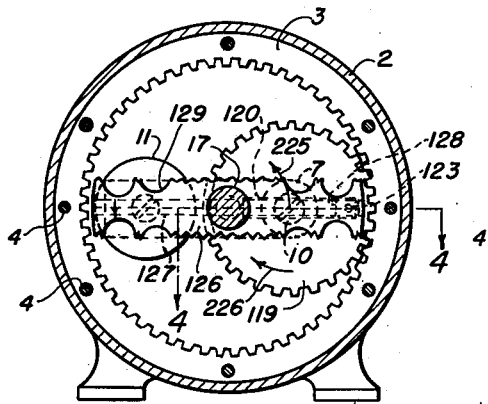
Figure 14:
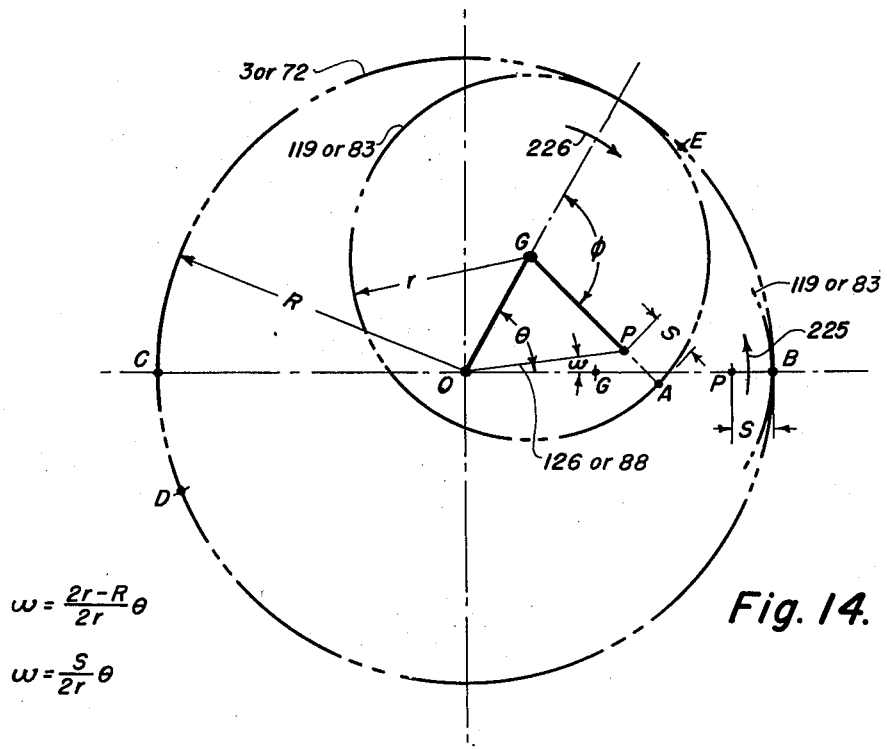
Figure 19:
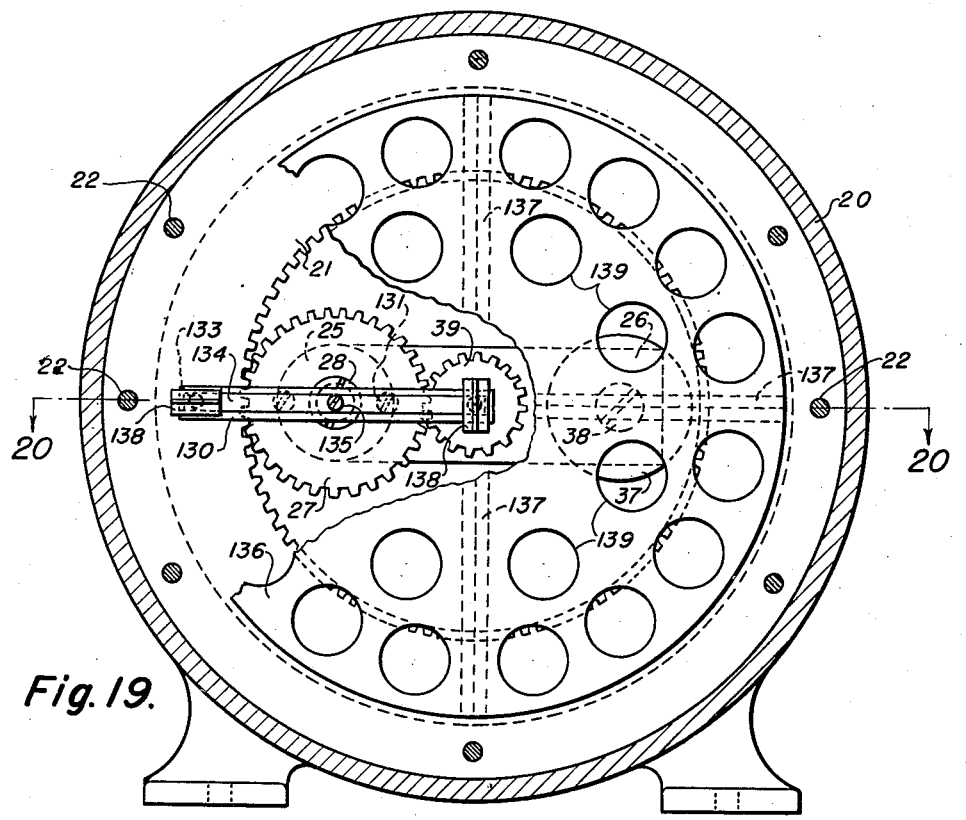
Figure 20:
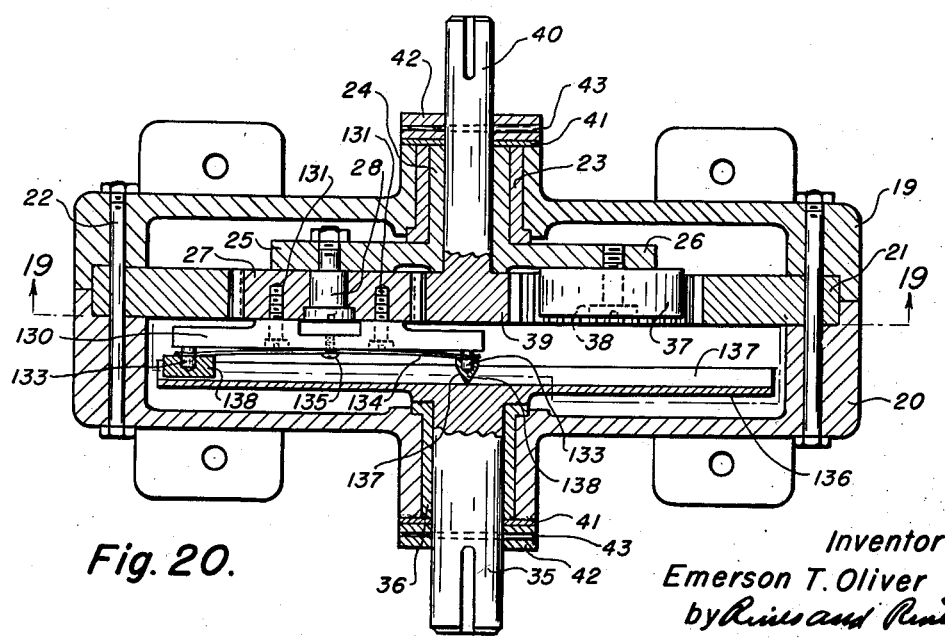
Figure 24:
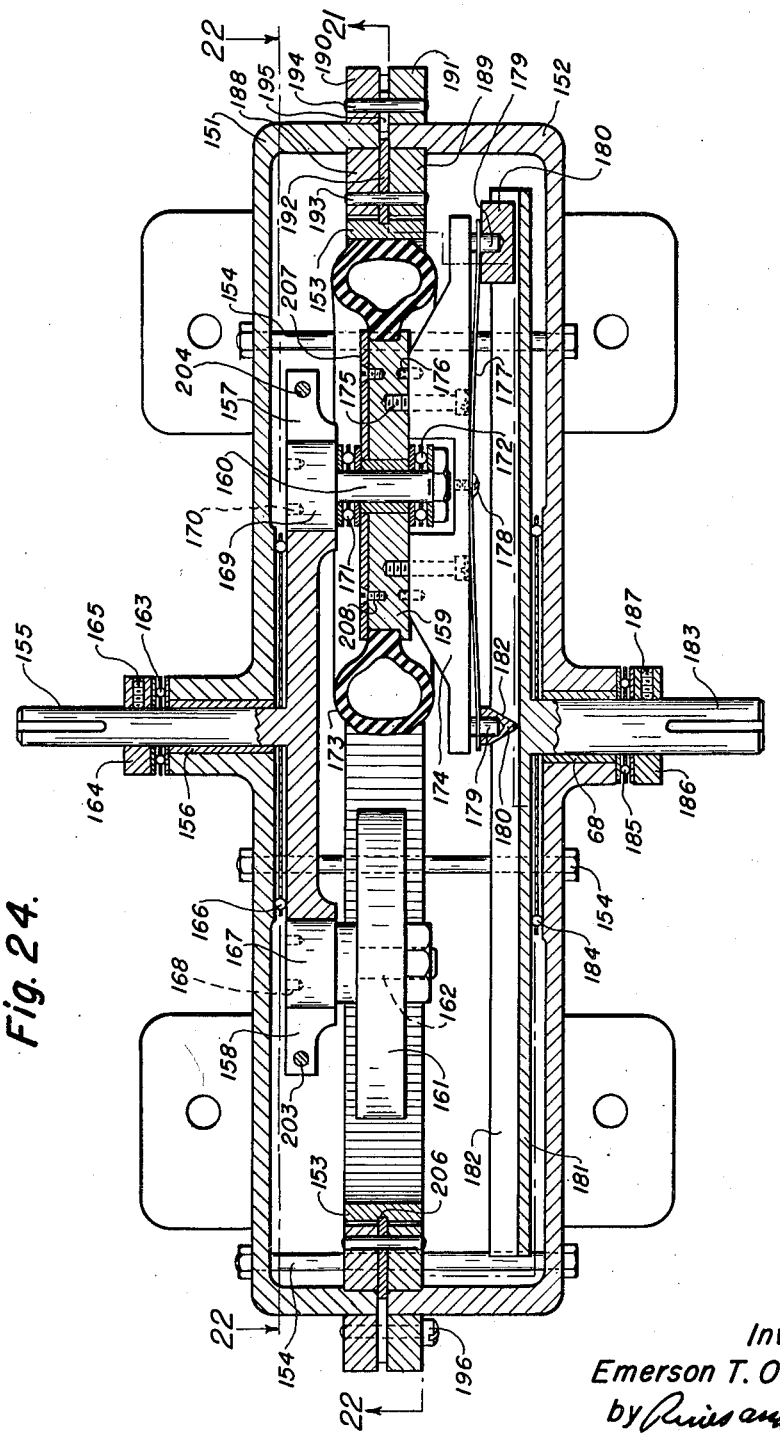
Figure 25:
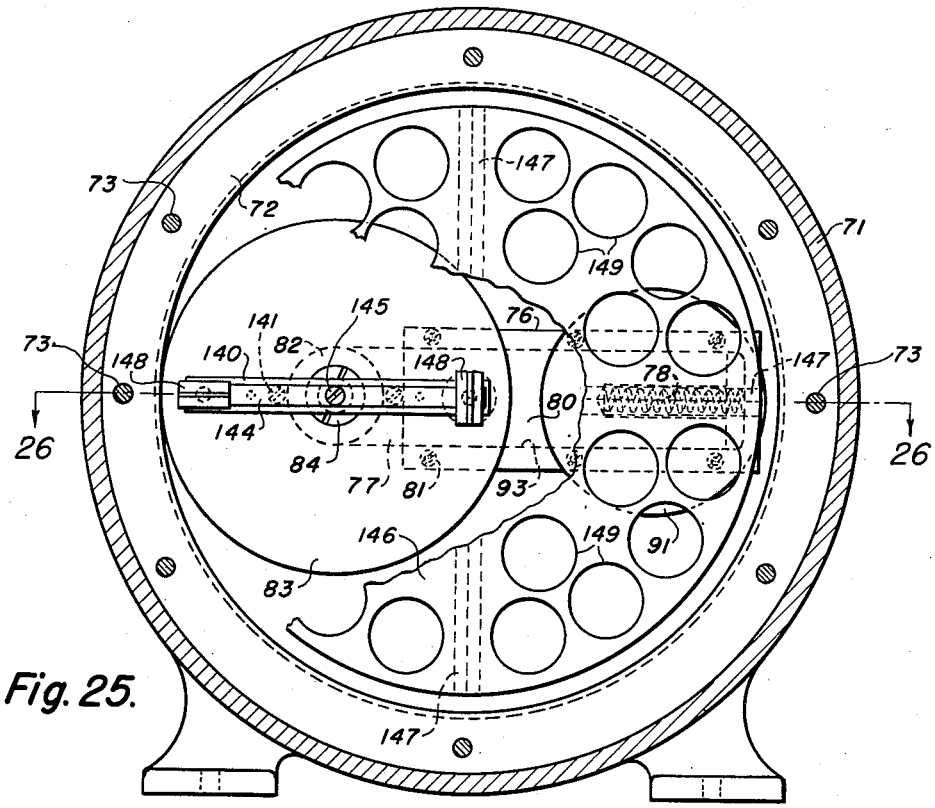
Figure 26:
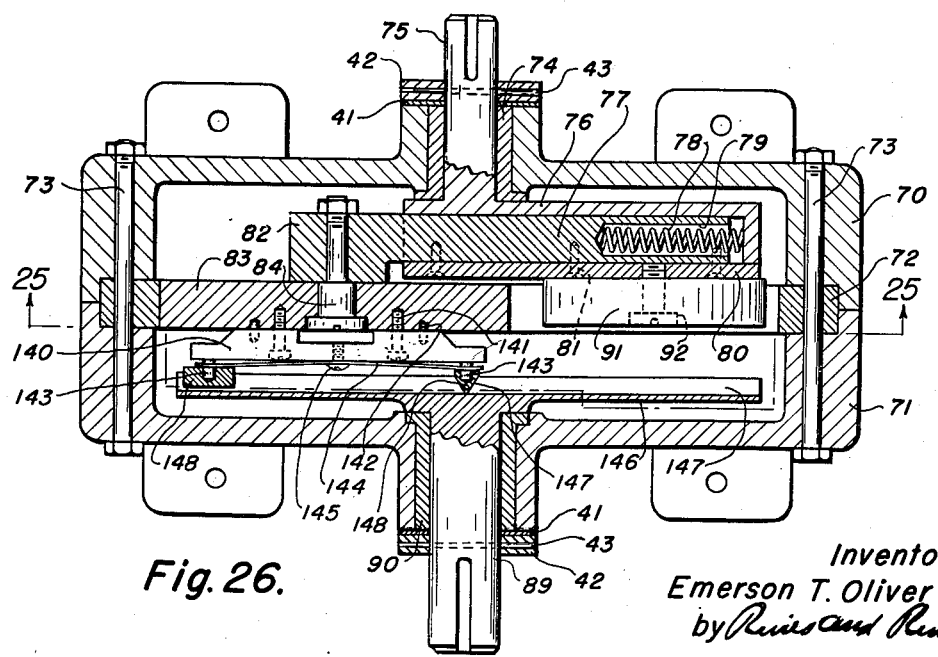
Figure 27:
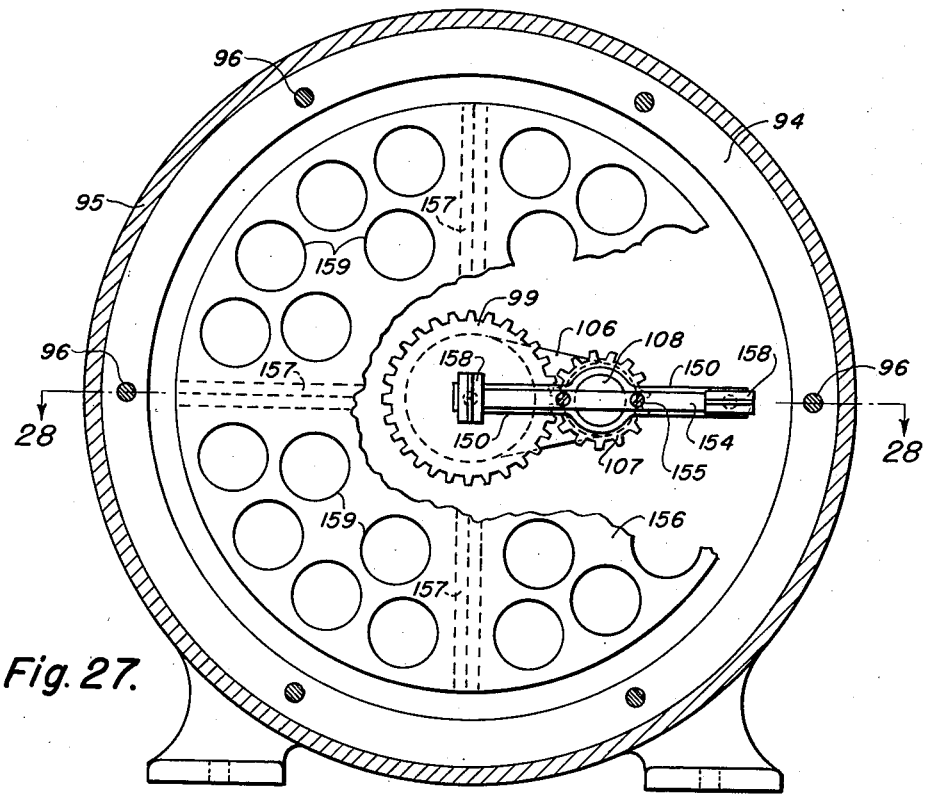
Figure 28:
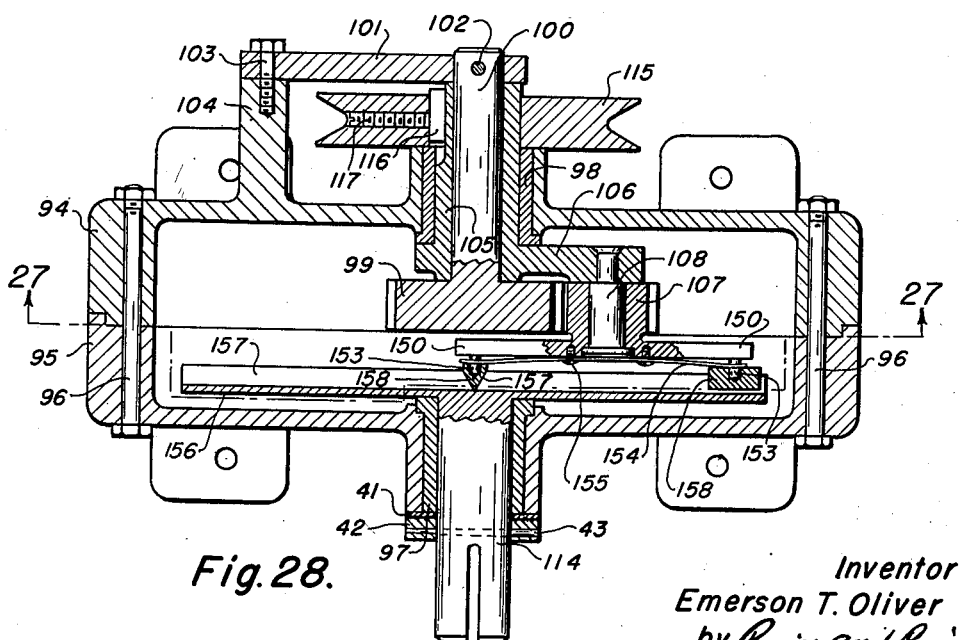
Figure 29:
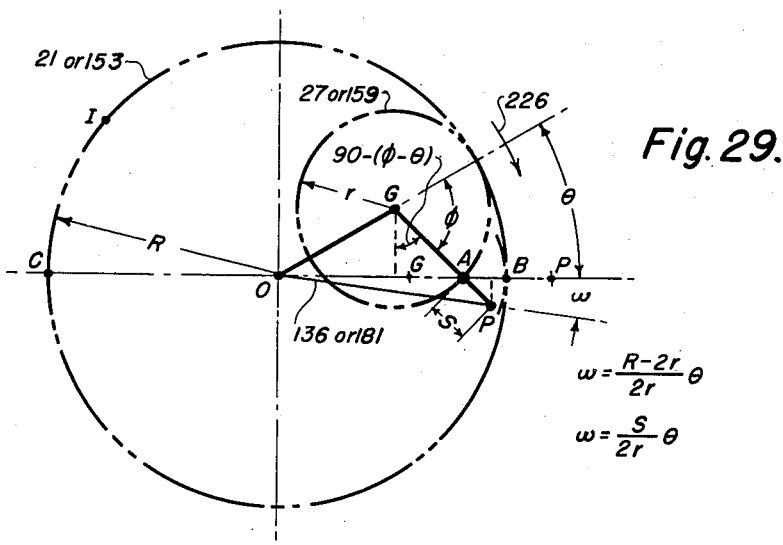
Figure 30:
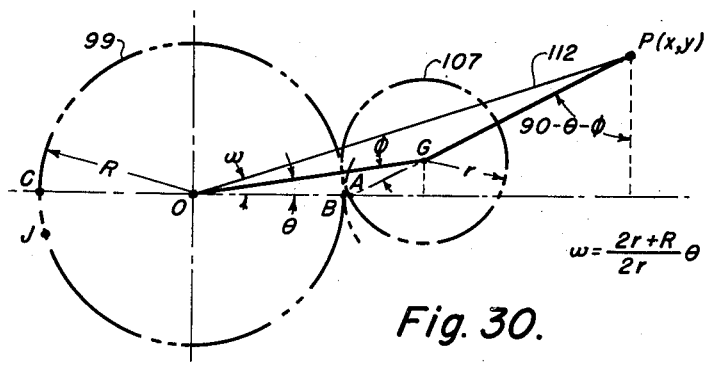
Figure 31:
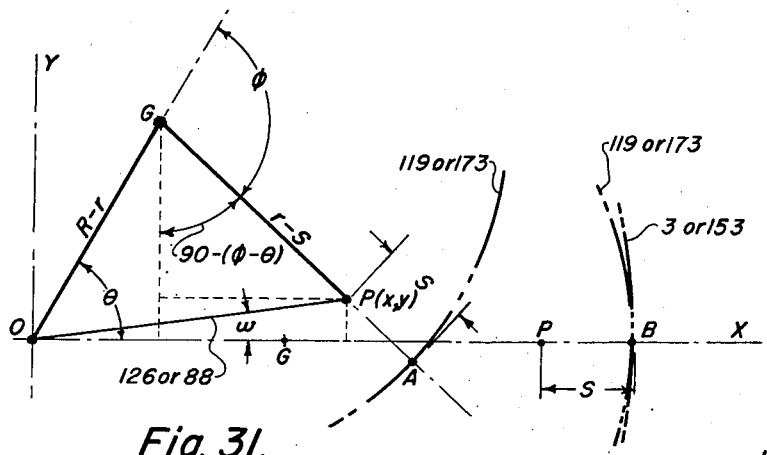

The invention will now be more fully explained in connection with the accompanying drawings, in which Fig. 1 is a vertical section, taken upon the line 1—1 of Fig. 2, looking in the direction of the arrows, of a speed-reducer constructed in accordance with the present invention; Fig. 2 is a horizontal section taken upon the line 2—2 of Fig. 1, looking in the direction of the arrows; Fig. 3 is a perspective, partly in section upon the line 3—3 and partly in section upon the line 2—2 of Fig. 1, looking in the directions of the respective arrows, with parts broken away, for clearness, and with the parts occupying relatively different positions; Fig. 4 is a section taken upon the line 4—4 of Fig. 6, looking in the direction of the arrows, but upon a larger scale; Fig. 5 is a section taken upon the line 5—5 of Fig. 4, looking in the direction of the arrows; Fig. 6 is a view similar to Fig. 1, of a modification, but upon a smaller scale; Figs. 7 to 11, inclusive, are views similar to Fig. 6, illustrating successive steps in the operation; Fig. 12 is a section taken upon the line 12—12 of Fig. 2, looking in the direction of the arrows; Fig. 13 is an end elevation, looking from the right of Fig. 12; Fig. 14 is a diagram explanatory of the mathematical theory underlying one form of the invention; Figs. 15 to 18, inclusive, are views similar to Fig. 14, showing diagrammatically successive branches of a hypotrochoidal path traced by the point P of Fig. 14; Fig. 19 is a vertical section similar to Fig. 1, taken upon the line 19—19 of Fig. 20, looking in the direction of the arrows, of a further modification; Fig. 20 is a horizontal section similar to Fig. 2, taken upon the line 20—20 of Fig. 19, looking in the direction of the arrows; Fig. 21 is a vertical section similar to Figs. 1 and 19, taken upon the line 21—21 of Fig. 24, looking in the direction of the arrows, of another modification; Fig. 22 is a fragmentary perspective of the modification shown in Figs. 21 and 24, partly in section upon the line 22—22 of Fig. 24, looking in the direction of the arrows; Fig. 23 is a section taken upon the line 23—23 of Fig. 21, looking in the direction of the arrows; Fig. 24 is a horizontal section similar to Figs. 2 and 20, taken upon the line 24—24 of Fig. 21, looking in the direction of the arrows, but upon a larger scale; Fig. 25 is a vertical section similar to Figs. 1, 19 and 21, taken upon the line 25—25 of Fig. 26, looking in the direction of the arrows, of still another modification; Fig. 26 is a horizontal section similar to Figs. 2, 20 and 24, taken upon the line 26—26 of Fig. 25, looking in the direction of the arrows; Fig. 27 is a vertical section similar to Figs. 1, 19, 21 and 25, taken upon the line 27—27 of Fig. 28, looking in the direction of the arrows, of a modification for increasing speed in accordance with the present invention; Fig. 28 is a horizontal section similar to Figs. 2, 20, 24 and 26, taken upon the line 28—28 of Fig. 27, looking in the direction of the arrows; Fig. 29 is a diagram similar to Fig. 14, but applicable to the form of the invention that is illustrated in Figs. 19 to 24, inclusive; Fig. 30 is a diagram similar to Figs. 14 and 29, but applicable to the form of the invention that is illusrated in Figs. 27 and 28; and Fig. 31 is a reproduction of a portion of the diagram of Fig. 14, upon a larger scale, in a setting of Cartesian coordinate axes X and Y, with additional symbols explanatory of the mathematical theory.

The invention is illustrated in Figs. 1 to 26, 29 and 31, as applied to speed reduction between alined high-speed and low-speed shafts, and in Figs. 27, 28 and 30 as applied to increasing, instead of decreasing, the speed.

The high-speed shaft is shown at 5 and the low-speed shaft at 17 in the embodiments of the invention shown by Figs. 1 to 18 and 31, inclusive; at 40 or 24 and at 35, respectively, in the embodiment of the invention shown by Figs. 19 and 20; at 155 and 183, respectively, in the embodiment of the invention illustrated by Figs. 21 to 24, inclusive; at 75 and 89, respectively, in the embodiment of the invention illustrated by Figs. 25 and 26; and at 114 and 105, respectively, in the embodiment of the invention illustrated by Figs. 27, 28 and 30.

In the embodiment of the invention illustrated by Figs. 1 to 18 and 31, the high-speed shaft 5 is shown journaled in a bearing 6 of a half-shell 1, and the alined low-speed shaft 17 is shown journaled in a bearing 18 of a half-shell 2. The half-shells 1 and 2 are shown secured together by bolts 4 to provide a closed container for the speed-reducing mechanism. The corresponding journal bearings for the high-speed shafts 40 or 24, 155, 75 and 114 are shown in Figs. 20, 24, 26 and 28, respectively, at 23, 156, 74 and 97, respectively mounted in the half-shells 19, 151, 70 and 95, and the corresponding journals for the respective low-speed shafts 35, 183, 89 and 105 at 36, 68, 90 and 98, respectively mounted in the half-shells 20, 152, 71 and 94.

In practice, the bearings 6 and 18 may be of the tapered-roller type, with a loaded thrust, but they are shown of a more simple type, for simplicity. The bearings are held securely in place by thrust collars 42 that are secured to the high-speed and the low-speed shafts by pins 43 extending through the collars 42 and the shaft, with a ball-bearing or washer 41 interposed.

Held stationary in the closed container of Figs. 1 to 11 by the bolts 4, between the half-shells 1 and 2, is an internal circular gear member 3 having internally disposed gear teeth. The internal circular gear member 3 is concentric with the axis of the alined high-speed and low-speed shafts 5 and 17. A similar circular gear 21 is shown in Figs. 19 and 20, held stationary in the closed container formed by the corresponding half-shells 19 and 20 by bolts 22. These circular gears 3 and 21 are shown respectively replaced in the modification of Figs. 21 to 24, by an untoothed friction-gear annulus 153, held stationary in the closed container formed by the half-shells 151 and 152 by bolts 154 and a friction-disc gear 173 in contact therewith. The corresponding annulus 72 of Figs. 25 and 26 is held stationary in the closed container formed by the half-shells 70 and 71 by bolts 73. The half-shells 94 and 95 are held together as a closed container by bolts 96.

The embodiment of the invention that is illustrated in Figs. 1 to 18 and 31 comprises a two-part arm, shown intermediately fixed between its two parts 7 and 8 to the high-speed shaft 5, so as to rotate therewith. A gear member 119 is freely pivoted on a pintle 10 carried by the part 7 of this two-part arm, to one side of the high-speed shaft 5. The gear member 119, therefore, rotates with the high-speed shaft 5, in a circular orbit about the axis of the alined high-speed and low-speed shafts 5 and 17, as shown in Figs. 6 to 11. Ball bearings, with a loaded thrust, may be interposed between the gear member 119 and the pintle 10, but they are omitted from the drawings, in order to simplify the disclosure. The other part 8 of the two-part arm carries a counterweight 11, held in place by a screw 12.

Since the teeth of the gear 119 are arranged externally, it will be convenient to distinguish between the two gears by referring to the gear 3 as an internal gear and the gear 119 as an external gear.

The teeth of the external gear 119 mesh with the teeth of the internal gear 3. During the rotation of the high-speed shaft 5, therefore, carrying the external gear 119 in its circular orbit about the high-speed shaft 5, the external gear 119, by reason of this meshing engagement of the gears 3 and 119, will rotate about its pintle 10.

The anti-clockwise-indicating arrows 225 of Figs. 6 to 11 indicate the direction of rotation of the high-speed shaft 5 and, therefore, the direction of travel of the external gear 119 in its circular orbit. The clockwise-indicating arrows 226 of Figs. 6 to 11 indicate the direction of rotation of the external gear 119 during its travel in its circular orbit.

These directions of rotation, indicated by the arrows 225 and 226 of Figs. 6 to 11, are the same as those shown in Fig. 14, where the large dot-and-dash circle, marked 3 or 72, of radius R, represents the stationary internal gear 3, and the small circle, marked 119 or 83, of radius $r$, represents the external gear 119. The common axis of the alined high-speed and low-speed shafts 5 and 17 is represented in Fig. 14 at O.

Let it be assumed, as shown by the dot-and-dash lines at the extreme right of Fig. 14, that the gears 3 and 119 were initially in tangential contact, with a point A of the periphery of the external gear 119 coincident with a point B of the periphery of the internal gear 3. The center G of the external gear 119, corresponding to the pintle 10, and the point P, representing a pintle projection 123 that is immovably fixed to the external gear 119, so as to be rotatable therewith, will therefore be disposed initially along the diameter BC of the internal gear 3, as shown.

Figure 15:
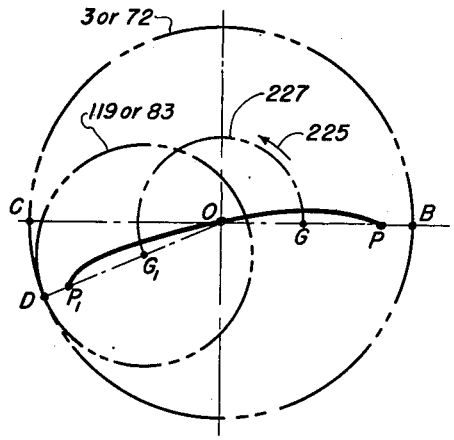

Let it be assumed further that the high-speed shaft 5 has been rotated anti-clockwise through an angle $\theta$ in the direction of the arrow 225 of Figs. 14 and 15. The gear 119 will therefore have been carried by the high-speed shaft 5, in its circular orbit 227 of Fig. 15, anti-clockwise, through the angle $\theta$. During its resulting rotation about its pintle 10, represented at G, it will therefore have rolled along the internal gear 3 clockwise, in the direction of the arrow 226 from its above-referred-to initial position into the further position shown in Fig. 14, through an angle $\phi$. The center G has accordingly traveled along the dot-and-dash circular arc, represented by 227 in Fig. 15, coincident with the circular orbit of travel of the external gear 119 about the common axis O of the alined high-speed and low-speed shafts 5 and 17.

For illustrative purposes, the radius R of the internal gear 3 is shown approximately double that of the radius $r$ of the external gear 119. According to the embodiment of the invention illustrated by Figs. 1 to 18 and 31, it is shown a little smaller than twice the radius $r$ of the external gear 119. A similar relation holds between the radius R of the untoothed friction-gear annulus 153 of the embodiment of the invention illustrated by Figs. 21 to 24 and the radius $r$ of the friction-disc gear 173 in contact therewith. The radius R of the internal gear 21 of Figs. 19 and 20 is shown a little larger than twice the radius $r$ of the corresponding external gear 27.

Though the practice of the invention is not dependent upon the choice of this particular approximate ratio 2 to 1, such choice will help toward an explanation of the principles underlying the invention.

To facilitate the explanation, it will be assumed, for the moment, that this ratio had been chosen exactly 2 to 1. Then, by the time that the external gear 119 would have become rotated throughout a complete revolution about its pivoting pintle 10, corresponding to which $\phi$ would have been equal to 360 degrees, the high-speed shaft 5 would have become rotated through a half-revolution, making $\theta$ equal to 180 degrees. The before-mentioned point A on the periphery of the small gear 119 that was initially coincident with the point B on the periphery of the internal gear 3, therefore, would then have reached the point C, diametrically opposite to the point B on the periphery of the internal gear 3.

As already stated, however, the radius $r$ of the external gear 119 is shown, in the modification of Figs. 1 to 18 and 31, as somewhat larger than half the radius R of the internal gear 3. By the time that the external gear 119 has become rotated throughout a complete revolution about its pivoting pintle 10, therefore, making $\phi$ equal to 360°, the point A on the periphery of the external gear 119 has reached a point D of the internal gear 3 that is beyond the point C. This is the situation represented in Fig. 15, where the pintle 10 has now assumed the position G₁. The external gear 119 has therefore rolled along the internal gear 3 through an arc of the internal gear such that $\theta$ is greater than 180 degrees. The excess arc CD will obviously be $2\pi r - \pi R$.

Figure 16:
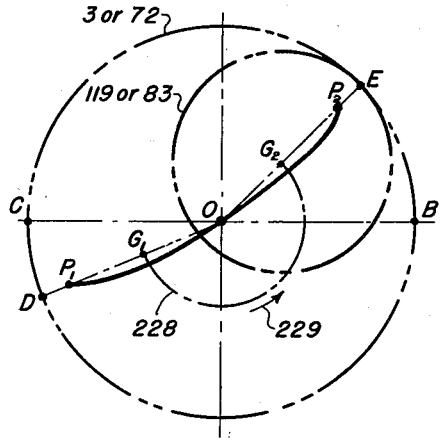

By the time that the external gear 119 has rolled further along the internal gear 3, so as to complete two revolutions about its pintle 10, corresponding to $\phi$ equal to 720 degrees, therefore, it will have assumed a new position such that the point A will have reached a point E, Fig. 16, where the arc BE is twice as great as the arc CD. The point A has therefore advanced anti-clockwise along the periphery of the internal gear 3, from its initial position, coincident with B, to the point E, and the pintle 10 has now assumed the position G₂ of Fig. 16. The angle $\theta$ through which the high-speed shaft 5 has now rotated is 360 degrees plus an additional angle represented by the arc BE of Fig. 16.

Figure 17:
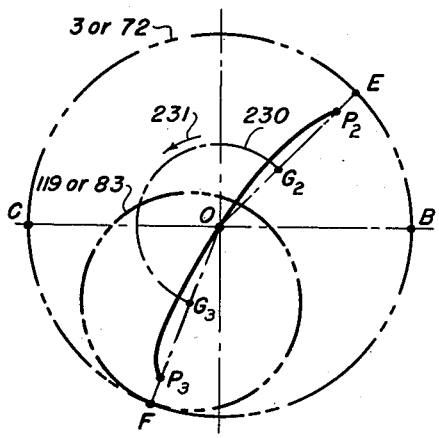
Figure 18:
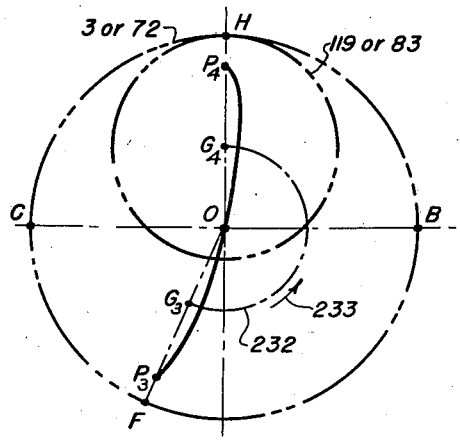

Further rotation of the high-speed shaft 5, as will be more fully explained presently, will cause the point A on the periphery of the external gear 119 to advance farther and farther anti-clockwise along the periphery of the internal gear 3, as shown at F in Fig. 17 and H in Fig. 18.

It has been stated that the pintle projection 123 is immovably fixed to the external gear 119, so as to be rotatable therewith, and that it is represented by the point P. This point P is shown at a distance S from the point A. During the rolling movement of the external gear 119 along the internal gear 3, therefore, the pintle 123, represented by the point P, travels along a hypotrochoidal path. Four successively disposed branches of this hypotrochoidal path are respectively represented in Figs. 15 to 18, inclusive, at PP₁, P₁P₂, P₂P₃, and P₃P₄.

Had the pintle projection 123 been positioned along the periphery of the external gear 119, as at the point A, its path of travel would have been hypocycloidal, instead of hypotrochoidal; and if the radius $r$ of the external gear 119 had been exactly half of the radius R of the internal gear 3, the hypocycloid would have degenerated into a straight line coinciding with the diameter BC of the internal gear 3.

An approximation to this straight-line path of travel of the pintle projection 123 along a diameter of the external gear 3 through the center O of this internal gear 3 may be obtained by employing the before-discussed approximate 2 to 1 ratio of R to $r$ and properly choosing the distance S. The full-line hypotrochoidal branches PP₁, P₁P₂, P₂P₃ and P₃P₄ of Figs. 15 to 18 are approximately straight, they are disposed nearly in coincidence with diameters of the internal gear 3, and they all pass through the center O of the internal gear 3. They are nevertheless sufficiently curved, and always in the same direction, to cause the pintle projection 123 to rotate progressively anti-clockwise during the continued rotation of the high-speed shaft 5 and the consequent rolling movement of the external gear 119 along the internal gear 3.

During one complete revolution of the external gear 119, the hypotrochoidal branch $PP_1$ of Fig. 15 is described, starting out from its initial position P on the diameter BC of the internal gear 3 and ending at P, at the free end of the radius $OG_1P_1D$. During this time, the high-speed shaft 5, carrying with it the external gear 119, rotates anti-clockwise, in the direction indicated by the arrow 225, through the 180 degree angle $\theta$ corresponding to the upper semi-circle BC of Fig. 15 plus an angle corresponding to the arc CD, the pintle 10 at the center of the external gear 119 travels anti-clockwise, along the dot-and-dash circular orbit 227 of Fig. 15, concentric with the point O, from the position G to the position $G_1$, and the pintle 123 travels along this hypotrochoidal branch $PP_1$, from its initial position P, to its end position $P_1$.

The point $P_1$ represents also the beginning of the next hypotrochoidal branch, as shown in Fig. 16. During the further travel of the external gear 119 in its circular orbit, along the dot-and-dash path 228 of Fig. 16, the pintle 10, at its center, travels, in the same anti-clockwise direction, indicated by the arrow 229, from the point $G_1$ to the point $G_2$. The projecting pintle 123 has therefore traveled further, this time along this next hypotrochoidal branch, from its beginning point $P_1$ to its end point $P_2$. The external gear 119 has now completed two revolutions, corresponding to which the angle $\phi$ equals 720 degrees.

If the ratio of R to $r$ had been exactly 2 to 1, the point A of the external gear 119 would now have become restored to its original initial position, coincident with the point B of the internal gear 3. Because the ratio of R to $r$ is a little more than 2 to 1, however, the point A of the external gear 119, at the end of two of its revolutions, as already explained, will have reached the point E, as diagrammatically shown in Fig. 16, at the free end of the radius $OG_2P_2E$.

With further continued rotation of the high-speed shaft 5, and with corresponding continued rolling of the external gear 119 along the internal gear 3, the operation thus far described will be repeated; bearing in mind, however, that the initial position of the gears 3 and 119 will now be regarded as indicated in Fig. 16, with the point A of the external gear 119 assumed to be in coincidence with the point E, instead of with the point B of Fig. 14. The end point $P_2$ of the hypotrochoidal branch $P_1P_2$ will now be the beginning of the hypotrochoidal branch following, the end point of which is shown in Fig. 17 at $P_3$. The pintle 123 will travel along this hypotrochoidal branch $P_2P_3$ during the travel of the pintle 10 at the center of the external gear 119 from the point $G_2$ to the point $G_3$, along the portion 230 of its circular arc of travel, in the direction of the arrow 231. Fig. 17, therefore, is precisely the same as Fig. 15, except that it has been arrived at by considering the initial position of the parts as shown in Fig. 16, whereas Fig. 15 was obtained by considering the initial position of the parts as shown in Fig. 14. Fig. 17 may therefore be obtained by rotating Fig. 15, in the direction of the anti-clockwise indicating arrow 229, through an angle corresponding to the arc BE of Fig. 16. The arc CF of Fig. 18 is equal to the sum of the arcs CD of Fig. 15 and BE of Fig. 16.

As the pintle 10, at the center of the external gear 119, travels further along the portion 232 of its dot-and-dash-line orbit in the direction 233, from the point $G_3$ of Fig. 17, to the point $G_4$ of Fig. 18, the hypotrochoidal branch shown in Fig. 18 becomes traced out by the pintle 123, from its beginning point $P_3$ to its end point $P_4$.

This progressive anti-clockwise rotation of this nearly-straight-line hypotrochoidal path of travel of the pintle 123 is utilized, according to the embodiment of the present invention that is illustrated in Figs. 1 to 18 and 31, to reduce the high-speed travel of the high-speed shaft 5 to the low-speed travel of the low-speed shaft 17. According to this embodiment of the invention, therefore, the high-speed shaft 5 may be regarded as the control shaft, and the low-speed shaft 17 as the controlled shaft.

To the attainment of this end, the pintle projection 123, or, rather, a wedge 128 that is freely pivoted about the pintle 123, so as to project from the gear member 119 into a straight-line slot 127 of a disc member 126 is fixed to the low-speed shaft 17, so as to rotate therewith. The straight-line slot 127 is V-shaped, in transverse cross-section, to correspond to the transverse cross-section of the wedge 128. The wedge projection 128 is therefore slidably mounted between the walls of the guide slot 127. The guide slot 127 is symmetrically disposed with respect to the common axis of the alined high-speed and low-speed shafts in order that its center may be disposed on that common axis. The pintle projection 123 and the wedge projection 128 mounted thereon, therefore, oscillate back and forth in the guide slot 127 along the hypotrochoidal path before described, passing through the center of the guide slot 127 each time that it oscillates from one end of the guide slot 127 to the other end. The high-speed control shaft 5 thus maintains control over the controlled low-speed shaft 17 through the engagement of the control projecting wedge 128 with the walls of the guide slot 127.

The two-part arm 7, 8 has been described as rotated by the high-speed shaft 5. The disc 126 is similarly rotated with the low-speed shaft 17, and about the same alined axis of the high-speed and low-speed shafts 5 and 17, represented at O in Figs. 14 to 18. The straight-line slot 127 intersects this common axis and is symmetrically disposed with respect thereto.

The relation of the parts may, of course, be reversed. The slot 127 may be provided on a member carried by the pintle 123, and the wedge 123 may be carried by the low-speed shaft 17.

In Fig. 6, as in Figs. 1 and 2, the wedge 128 which, as before stated, is freely mounted pivotally about the pintle 123, is shown centered on the axis of the alined high-speed and low-speed shafts 5 and 17. During the travel of the gear 119 from the position of Fig. 6 to that of Fig. 7, therefore, the projecting wedge 128 on the pintle projection 123 will travel along the first approximately straight hypotrochoidal branch $PP_1$ away from this axis, to the position indicated by dotted lines in Fig. 7. The resulting engagement of the wedge 128 with the walls of the slot 127 into which it projects will cause the disc 126 to travel through an angle anti-clockwise, in the direction of the arrow 225, from the position of Figs. 1, 2 and 6, to that of Fig. 7 with consequent anti-clockwise rotation of the low-speed shaft 17 to which it is secured. The anti-clockwise rotation may be observed by inspection, through noting that the dotted-line showing of the slot 127 is displaced in Fig. 7 anti-clockwise compared to the showing of Fig. 6.

Figure 7:
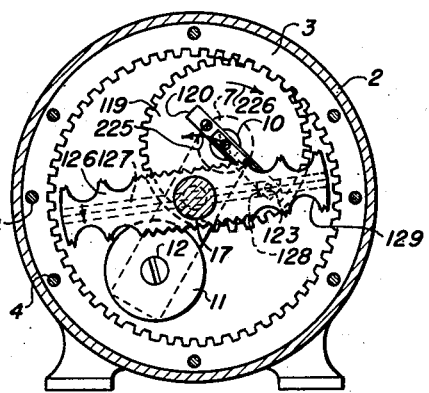

The comparatively large angle θ through which the external gear 119 has been carried anti-clockwise in its circular orbit, from the position shown in Fig. 6 to that of Fig. 7, representing the corresponding anti-clockwise rotation of the high-speed shaft 5, has therefore been converted into a comparatively small angle of anti-clockwise rotation of the low-speed shaft 17, represented by the relatively small angle of displacement of the disc 126 from the position of Figs. 1, 2 and 6, into that of Fig. 7. This angle of anti-clockwise rotation of the low-speed shaft 17 is represented at ϖ in Fig. 14.

Figure 8:
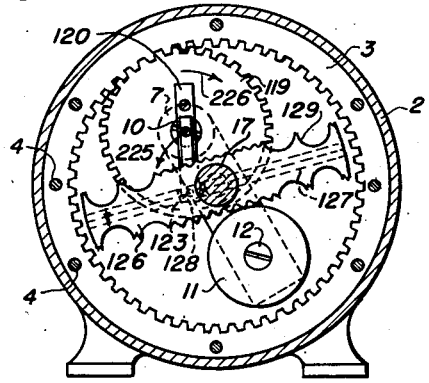

Further continued anti-clockwise rotation of the high-speed shaft 5 will carry the external gear 119 from the position of Fig. 7 to that of Fig. 8. By the time that the high-speed shaft 5 has rotated through 180 degrees anti-clockwise, in the direction of the arrow 225 of Fig. 15, the parts will occupy the positions illustrated in Fig. 9. During this 180 degree rotation of high-speed shaft 5, the wedge 128, on the pintle 123, will have travelled further along the slot 127, along the same hypotroidal branch PP₁, from the position of Fig. 8 to that of Fig. 3 or Fig. 9.

Figure 9:
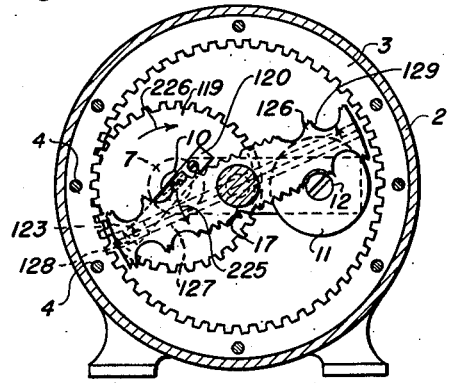
Figure 10:
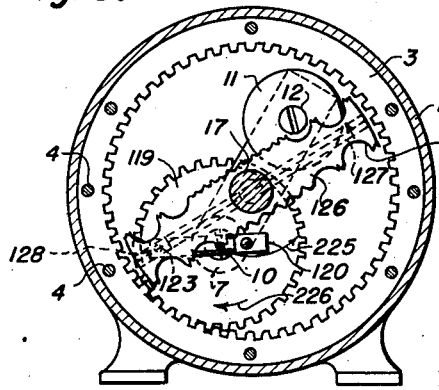

An anti-clockwise rotation of the high-speed shaft 5 through an angle θ equal to 180 degrees, carrying the external gear 119 in its orbit also through 180 degrees, from the position of Figs. 1, 2 and 6 to that of Fig. 9, has therefore now been converted into a relatively small anti-clockwise rotation of the low-speed shaft 17, represented by the angular difference ϖ between the positions occupied by the disc 126 in Figs. 6 and 9.

Rotation of the high-speed shaft 5 through a further angle, represented by the arc CD of Fig. 14, will result in the wedge 128 reaching the end limit of its outward travel along the said hypotroidal branch PP₁ in the slot 127, as represented in Fig. 15, which limit constitutes also the beginning limit P₁ of the next branch P₁P₂ of the hypotrochoidal path, as illustrated in Fig. 16. The parts will then occupy a position between the positions of Figs. 9 and 10. The angular travel ϖ of the disc 126 and, therefore, of the low-speed shaft 17 to which it is secured, of course, will have become correspondingly increased.

Figure 11:
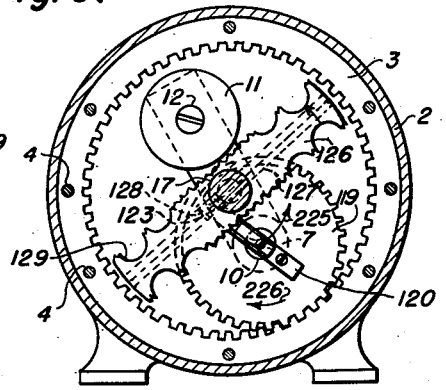
Figures 12, 13:
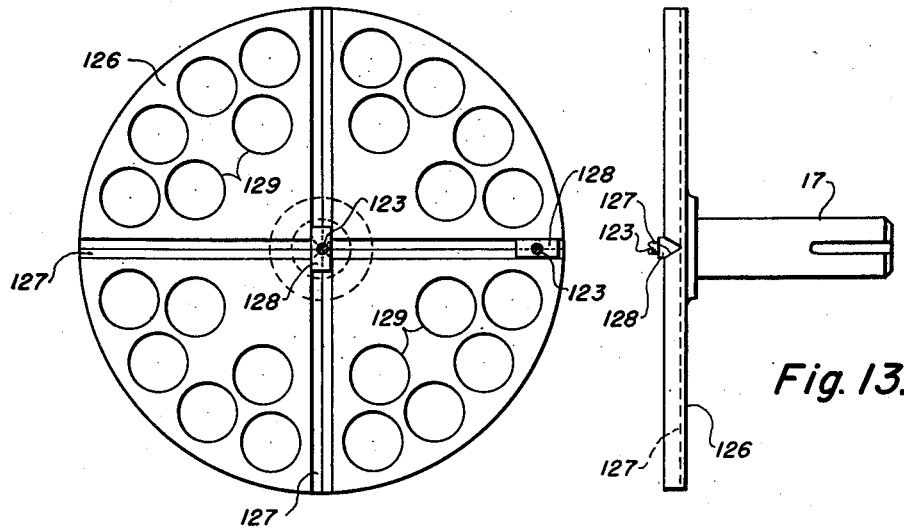

With further continued anti-clockwise rotation of the high-speed shaft 5, carrying the external gear 119 with it, the wedge 128 retraces its travel in the slot 127, as a comparison of the positions of the wedge 128 in Figs. 9 and 11 will demonstrate. This retraced travel, however, is along the next branch P₁P₂ of the hypotrochoidal curve, as illustrated by Fig. 16. The angular travel ϖ of the disc 126, however, is nevertheless continued in the same anti-clockwise direction, represented by the arrow 229 of Fig. 16, which is the same as that of the arrow 225 of Fig. 11.

As the high-speed shaft 5 continues to rotate anti-clockwise, carrying the external gear 119 beyond the position of Fig. 11, the wedge 128 on the pintle 123 continues its retracing movement in the slot 127 along the said next branch P₁P₂ of the hypotrochoidal path. After returning to its central position, the wedge 128 will travel therebeyond until it reaches the opposite extreme position, represented by the point P₂ of Fig. 16.

By the time that the high-speed shaft 5 has been rotated throughout one complete revolution, as before explained, the external gear 119 will have been carried in its circular orbit back to and beyond the original position, illustrated in Fig. 6. The low-speed shaft 17, however, will have completed only a very small fraction of a revolution, represented by the angular difference ϖ between the position of the disc 126 shown in Fig. 6 and the position of the same disc 126 occupying a position somewhat in advance of that illustrated in Fig. 11.

With still further continued clockwise rotation of the high-speed shaft 5, carrying the external gear 119 with it, the wedge 128 will continue its travel in the slot 127 to the end limit P₃ of the said next branch P₂P₃ of the hypotrochoidal path, as represented in Fig. 17.

According to a feature of the present invention, therefore, two relatively movable members 119 and 126 are provided, of which the member 119 may be an external circular gear member that is movable relatively to the internal circular gear member 3. The member 119 may be referred to as a control member, because it is fixed to travel with the high-speed control shaft 5. The controlled member 126 is fixed to the low-speed controlled shaft. The control member 119 is provided with the projecting pintle 123 upon which the wedge projection 128 is mounted. The pintle 123 and the wedge 128 may be referred to as control projections, because they are part of the external gear 119, that is mounted upon the high-speed control shaft 5. Though the pintle 123 is fixed to the member 119, so as to be immovable relatively thereto, it is also slidable in the slot 127 of the member 126 and the controlled low-speed shaft 17 to which it is fixed in response to the rolling movement of the gear member 119 along the internal gear member 3. The gear member 119 is so connected to the high-speed shaft 5 as to be rotatable therewith in a circular orbit 227, 228, 230, 232 about the axis of this shaft 5. As the disc member 126 is fixed to the low-speed shaft 17, and as the low-speed shaft 17 is alined with the high-speed shaft 5, the member 126 is pivotally movable about the common axis of the alined high-speed and low-speed shafts 5 and 17. Rotation is thus transmitted at reduced speed from the high-speed shaft 5 to the low-speed shaft 17.

The degree of speed reduction between the high-speed and low-speed shafts 5 and 17, as will presently appear, is a simple function of the radius R of the internal gear 3 and the radius r of the external gear 119. The direction of rotation of the disc 126 and, therefore, of the low-speed shaft 17, shown anti-clockwise, as will also presently appear, is also determined by the relative values of the radii R and r.

That the direction of this rotation of the disc 126 is correctly shown the same as that of the high-speed shaft 5 is evident from the discussion above of Figs. 14 to 18; for, at the end of two complete revolutions of the external gear 119, the peripheral point A, occupying initially the point B, assumes the position E, beyond the initial point B of the internal gear 3. This results from the fact, as before explained, that the radius r of the external gear 119 is larger than half the radius R of the internal gear 3. The point P of the external gear 119, initially occupying a position just to the left of the point B, as shown in Figs. 14 and 15, therefore, similarly now occupies the position P₂ of Fig. 16. As the point P represents the pintle projection 123, the disc 126, in the slot 127 of which the wedge 128 is positioned, becomes thus farther advanced angularly along the circular arc 228 during the continued rotation of the high-speed shaft 5. The disc 126 was originally positioned with the point P along the diameter BC of the internal gear 3. The wedge 128, however, has now carried this disc 126 through an angle such that it occupies the position P₂ of Fig. 16, and in a direction the same as the direction of rotation of the high-speed shaft 5. As the disc 126 is fixed to the low-speed shaft 17, the low-speed shaft 17 has been rotated through the same angle, in the same direction.

If the radius $r$ of the external gear 119 were smaller than half the radius R of the internal gear 3, however, as will be explained hereinafter, a rotation of the high-speed shaft 5 in one direction would be converted into a rotation of the low-speed shaft 17 in the opposite direction.

It is now in order to explain the mathematical theory underlying the operation of the embodiment of the invention that is disclosed in Figs. 1 to 18, inclusive, and 31.

To summarize, it has been assumed that the large circle of Fig. 14 represents the stationary internal gear 3, of radius R, and the small circle the rolling external gear 119, of radius $r$. It has been assumed also that the two gears 3 and 119 were originally disposed so that the peripheral point A of the external gear 119 was coincident with the peripheral point B of the internal gear 3; and that, in response to the anti-clockwise rotation of the high-speed shaft 5 through the angle $\theta$, the external gear 119 has rolled along the internal gear 3 through the angle $\phi$. During this rolling movement, the pintle 123 represented by the point P, at a distance S from the peripheral point A of the external gear 119, has engaged the walls of the slot 127 to effect rotation of the disc 126 that is provided with the slot 127.

It has further been assumed that, during the time that the high-speed shaft 5 has rotated through the angle $\theta$, and the external gear 119, therefore, has rolled through the angle $\phi$, the disc 126, provided with the slot 127, has rotated through an angle $\omega$, to assume the position OP of Fig. 14. As the disc 126 is integral with the low-speed shaft 17, therefore, the low-speed shaft 17 has likewise rotated through the angle $\omega$. The rotation of the high-speed shaft 5 through the angle $\theta$ has accordingly become converted into rotation of the low-speed shaft 17 through the smaller angle $\omega$, and in the same anti-clockwise direction.

It is proposed to find the value of the angle $\omega$ of rotation of the low-speed shaft 17 in terms of the angle $\theta$ of rotation of the high-speed shaft 5 and the respective radii R and $r$ of the internal gear 3 and the external gear 119.

To this end, reference may be made to Fig. 31, in which, as in Fig. 14, the line OP is marked as representing the disc 126 or the member 88. Let $x$ represent the abscissa of the point P, and $y$ its ordinate. The equations representing the hypotrochoidal path of the point P may then readily be found to be $$x = (R-r)\cos\theta + (r-s)\cos(\phi-\theta)$$

$$y = (R-r)\sin\theta - (r-s)\sin(\phi-\theta)$$

As, moreover, the arc rolled out along the external gear 119 is of the same length as the arc rolled out on the internal gear 3, $$R\theta = r\phi$$

Since the pintle 123, represented at P, furthermore, must pass through the center O, $$R - r = r - s$$

The equations of the hypotrochoid therefore reduce to $$x = (R-r)\cos\theta + \cos\frac{R-r}{r}\theta$$

$$y = (R-r)\sin\theta - \sin\frac{R-r}{r}\theta$$

which may be written $$x = 2(R-r)\cos\frac{R}{2r}\theta\cos\frac{2r-R}{2r}\theta$$

$$y = 2(R-r)\cos\frac{R}{2r}\theta\sin\frac{2r-R}{2r}\theta$$

whence $$\tan\omega = \frac{y}{x} = \tan\frac{2r-R}{2r}\theta$$

It follows that $$\omega = \frac{2r-R}{2r}\theta = \frac{S}{2r}\theta$$

There is also a further solution, involving the same angle augmented by 180°.

The first of these solutions applies to the part of each hypotrochoidal branch on one side of the center O, and the other to the part of the same hypotrochoidal branch on the other side of that center. Since the same disc 126 is involved in both cases, however, there is really only one and the same solution, insofar as the relation between the speed of rotation of the low-speed shaft 17 with respect to that of the high-speed 5 is concerned.

The solution may be obtained also geometrically, merely by noting, in Figs. 14 and 31, that the triangle GOP is isosceles. The angles opposite the equal sides GO and GP of this triangle, therefore, are each equal to $$\frac{\phi}{2}$$

It follows, from mere inspection, that $$\omega = \theta - \frac{\phi}{2}$$
$$= \theta - \frac{R}{2r}\theta$$
$$= \frac{2r-R}{2R}\theta$$
$$= \frac{S}{2r}\theta$$

This geometric solution, however, is obtained for the first quadrant only, and only for the particular relative values of R and $r$ shown in Figs. 14 and 31. The analytic solution above, on the other hand, is perfectly general.

The low-speed shaft 17 thus rotates at a speed that is the same as that of the high-speed shaft 5, multiplied by a constant fraction of which the numerator is the radial distance S of the pintle 123 from the periphery of the external gear 119, and the denominator is the diameter $2r$ of the external gear 119. This fraction is less than unity by a fraction equal to the ratio of the radius R of the large fixed internal gear 3 to the diameter of the small rolling external gear 119. If the high-speed shaft 5 rotates uniformly, therefore, it will rotate the low-speed shaft 17 uniformly, at this reduced rate.

In Figs. 15 to 18, it is assumed that the ratio $$\frac{S}{2r} = \frac{1}{9}$$

At each complete revolution of the external gear 119, therefore, the external gear 119 rolls over a portion of the periphery of the internal gear 3 equal to 180 degrees plus an arc CD equal to 22½ degrees. At the end of four revolutions of the external gear 119, accordingly, the pintle 123, represented by the point P, will have become rotated through an angle of 90 degrees, as may be observed by comparing the position of P in Fig. 15 with that of $P_4$ in Fig. 18. The high-speed shaft 5, therefore, will have become rotated through two complete revolutions plus 90 degrees during the time that the low-speed shaft 17 will have become rotated through only 90 degrees.

It is found, in practice, that if only one control wedge member 128 is employed, it often loses control slightly at times when, during its oscillatory movements, it passes through the center of the guide slot 127, alined with the common axis of the high-speed and low-speed shafts 5 and 17. Though it automatically corrects for the slight misorientation of the controlled disc member 126 thus produced as soon as it passes this dead-center position, such automatic reorientation is frequently attended by loud noises resulting from the control wedge projection 128 hammering against the walls of the guide slot 127 during the process of this reorientation. At times, furthermore, the control wedge projection 128 stops altogether in its said position of dead center, without any further travel back and forth in the guide slot 127. The high-speed control shaft 5 then continues rotating, but without any further control over the low-speed shaft 17. In order to reestablish the control of the high-speed shaft 5 through the control wedge projection 128, it then becomes necessary first to reorient the controlled disc member 126 to its proper angular position, after which it becomes possible to actuate the control wedge projection 128 out of its dead-center position, and into another portion of the guide slot 127, so as to enable it to reassume control over the controlled disc member 126.

In accordance with a feature of the present invention, however, the high-speed control shaft 5 is provided with more than one control wedge projection 128, and the number of guide slots 127 is correspondingly increased, so as to provide a separate guide slot for each wedge projection 128. According to the specific embodiment of the invention that is herein illustrated and described, the high-speed control shaft 5 is provided with two diametrically opposed control wedge projections 128, respectively slidable in two guide slots 127 provided upon the control disc member 126 at right angles to each other. This is more particularly illustrated in Figs. 12 and 13.

At times when one of the control wedge projections 128, during the travel of the control gear member 119 in its circular orbit 227, 228, 230, 232 about the common axis O of the alined shafts, happens to be passing through its dead-center position, the other control projection 128 will therefore be occupying a position at one of the ends of its guide slot. To compensate for the possible loss of control of the controlled disc member 126 by the said one control wedge projection 128 at the dead-center position, therefore, the other projection 128 will exert a maximum leverage upon the controlled disc member 126. When this other wedge projection 126, in turn, occupies its dead-center position, on the other hand, the said one wedge projection 128 will exert the maximum leverage. The controlled disc member 126 and the low-speed shaft 17 to which it is fixed will thus be under full control at all times to maintain the rotation of the low-speed shaft steady.

As an alternative construction for effecting the same result, an additional external gear 119 might be provided diametrically opposite to the external gear 119 shown, and rotatable therewith from the high-speed shaft 5. These two gears would be provided, each with one of the wedges 128, and each riding in one of the wedge-shaped slots 127 of the disc 126.

The two wedge projections 128 are illustrated in Figs. 1, 2 and 3 as mounted upon two respective pintles 123 that are carried at opposite ends of an arm 120. The arm 120 is held to the external gear member 119 by means of screws 121, and guide pins 122 are provided to help prevent rotation thereof with respect to the external gear member 119. It is, of course, obvious, that the members 128 need not be in the form of wedges. The wedge construction, however, helps to prevent lost motion with respect to the walls of the V-shaped slots 127. In order the better to effectuate this result, the ends of a leaf spring 124, intermediately held to the arm 120 by a screw 125, are interposed around the pintle projections between the wedges 128 and the arm 120. The wedge shape permits also of taking up wear between the faces of the wedges and the walls of the guide slots in which they slide. The angle of the wedge is preferably 60 degrees. The wedges may be provided with ball bearings, not shown. The projections about which the wedges are pivoted may rotate in holes in the arms 120 provided with the ball bearings. In order to reduce the effects produced by the inertia of a large disc member 126, it is shown provided with perforations 129.

The invention is, however, operative with only a single wedge projection 128. For this reason, and also in order to simplify the disclosure, the single-wedge-projection modification is illustrated in Figs. 6 to 11, with the disc 126 shown broken away.

If the radius r of the external gear 119 had been less than half the radius R of the internal gear 3, it would have been necessary to mount the pintle 123 upon an arm extending rigidly beyond the periphery of the gear 119. A construction of this kind is illustrated in Figs. 19 and 20, the radius r of the external gear 27 of which, as before stated, is somewhat less than half the radius R of the internal gear 21.

The diagram for this case corresponding to Fig. 14 appears in Fig. 29. The internal gear 21 is represented by the large dot-and-dash circle of Fig. 29, marked 21 or 153, and the external gear 27 by the small dot-and-dash circle, marked 27 or 159. The line OP is marked 136 or 181.

To the two-part arm 7, 8 of Figs. 1 to 11 corresponds the two-part arm 25, 26 of Figs. 19 and 20. The part 25 of the two-part arm 25, 26 carries the counterweight 37, corresponding to the counterweight 11, held in place by a screw 38.

The part 26 carries a pintle 28, corresponding to the pintle 19, about which the external gear 27 is pivoted. The pintles 133 correspond to the pintles 123. About these pintles 123 are pivoted wedges 138, corresponding to the wedges 128, which engage the walls of guide slots 137 of a disc 136, perforated at 139, corresponding to the guide slots 127 of the perforated disc 126.

In order that the hypotrochoidal path of travel of each pintle 133 may pass through the center of the internal gear 21, the same as the hypotrochoidal path of travel of each corresponding pintle 123 passes through the center O of the internal gear 3, as shown in Figs. 14 to 18, it becomes necessary, as already stated, to mount it external to the periphery of the gear 27. According to the embodiment of the invention that is illustrated in Figs. 19 and 20, this is effected by mounting the pintles 133 upon an arm 130 that may be fixed to the gear 27 by screws 131, but relatively farther out than the pintles 123 are mounted on the corresponding arm 120. The spring 134 is held to the arm 130 by a screw 135, and performs the same function as the spring 124.

It has been explained that, since the radius $r$ of the external gear 119 is greater than half the radius $R$ of the internal gear 3 of Figs. 1 to 18 and 31, the external gear 119, during a complete revolution, rolls along an arc of the internal gear 3 somewhat greater than 180 degrees, the excess being represented by the arc CD of Fig. 14. Since the radius $r$ of the external gear 27 is less than half the radius $R$ of the internal gear 21, on the other hand, the gear 27, during a complete revolution thereof, rolls along an arc of the internal gear 21 somewhat less than 180 degrees. The deficiency of the arc is $\pi R - 2\pi r$, represented in Fig. 29 by the arc IC.

It has also been explained that, because of the excess arc CD of Fig. 14, the disc 126, with its slot 127, is rotated, together with the low-speed shaft 17 to which it is attached, as shown in Figs. 6 to 11, in the same direction as the high-speed shaft 5. In the modification of Figs. 19 and 20, on the other hand, because the gear 27, during a complete revolution, rolls along an arc of the internal gear 21 somewhat less than 180 degrees, the disc 136, with its slot 137, corresponding to the disc 126, with its slot 127, is rotated in a direction opposite to the direction of rotation of the two-part arm 25, 26. Rotation of the two-part arm 25, 26 in one direction, therefore, will effect rotation of the low-speed shaft 35 in the opposite direction. This is readily apparent geometrically from Fig. 29, since the arc BI is less than the semicircular arc BC, and it may also be demonstrated analytically.

It is possible to derive the equations for the hypotrochoidal path of travel of the pintle 133 by inspection of Fig. 29. The analytic solution derived above, however, may be applied to this case also, if it is borne in mind that the sign of S is now negative. The ratio of the speed reduction between the two-part arm 25, 26 and the low-speed shaft 35 may be represented by the same formulas already derived, but with a negative sign, since the angle is negative. These formulas may also be obtained geometrically from an inspection of Fig. 29, bearing in mind that the triangle GOP is isosceles.

These formulas represent the speed reduction between the speed of the rotation of the sleeve 24, to which the two-part arm 25, 26 is secured, and the low-speed shaft 35. To obtain the speed reduction between the high-speed shaft 40 and the low-speed shaft 35, it is necessary to multiply this ratio by the ratio between the radius of a gear 39, that is integral with the high-speed shaft 40, and the radius of the external gear 27, in meshing engagement therewith. A further speed reduction is thus obtained by causing the external gear 27 to mesh with both the internal gear 21 and the gear 39 that is fixed to the high-speed shaft 40.

This further speed reduction is not, of course, limited to the particular modification of Figs. 19 and 20.

A further speed reduction still, moreover, could be obtained by interposing additional gears. The relative directions of rotation of the high-speed and the low-speed shafts 40 and 35 could also be changed through the medium of this expedient.

The sleeve 24 is disposed loosely between the highspeed shaft 40 and the journal bearing 23. As in the embodiment of the invention illustrated by Figs. 1 to 18 and 31, the parts are shown held securely in place on the highspeed shaft 40 by the thrust collar 42 that is secured to the high-speed shaft 40 by the pin 43 extending through the collar 42 and the shaft 40, with a washer or ball-bearing 41 is interposed. The sleeve 36 is similarly held in place.

In respects other than the reversal of the direction of rotation of the low-speed shaft 35, with corresponding to modification of the shape of the hypotrochoidal-branch paths shown in Figs. 15 to 18, to provide epitrochoids, instead, and in respects other than is involved in the introduction of the intermediate gear 39, the operation of the modification shown in Figs. 19 and 20 is substantially the same as described in connection with Figs. 1 to 18 and 31.

It is not essential that the rolling relation between the externally contoured member 119 or 27 and the corresponding internally contoured member 3 or 21 be effected by means of gear teeth. A similar result may be obtained in other ways as, for example, frictionally. The replacement of the rolling-gear action by frictional rolling is illustrated in modification of Figs. 21 to 24 and also the modification of Figs. 25 and 26.

The parts 7 and 8 of the two-part arm of Figs. 1 to 18 and 31 are represented in Figs. 21 to 24 at 157 and 158, respectively. The part 158 carries a counterweight 161, secured by a screw 162. The part 157 is provided with a pintle 160 about which is pivoted the circularly contoured friction gear wheel 159, corresponding to the external gear 119 or 27, and the external periphery of which carries a replaceable tire 173 that engages frictionally, in rolling contact, with the inner peripheral contour of the annulus 153, corresponding to the internal gear 3 or 21.

The radius $r$ of the tire 173 is shown slightly smaller than half the radius $R$ of the annulus 153, corresponding to the showing of Figs. 19 and 20, where the radius $r$ of the external gear 27 is shown slightly smaller than half the radius $R$ of the internal gear 21. The diagram of Fig. 29, therefore, is as applicable to this embodiment of the invention as to the embodiment shown in Figs. 19 and 20. The large dot-and-dash circle may represent the stationary annulus 153 and the small the tire 173.

The pintles 179 of this embodiment of the invention, corresponding to the pin 133 of Figs. 19 and 20, are therefore shown carried upon an arm 174, similar to the arm 130 of Figs. 19 and 20, held fixed to the wheel 159 by screws 175. The spring 177, held to the arm 174 by a screw 178, corresponds to the springs 124 and 134, and the guide pins 176 to the guide pins 22. The pintles 179 are confined to travel, in their respective hypotrochoidal paths, back and forth through the center O, Fig. 29, of the annulus 153, the same as the pintles 123 must travel through the center O of the internal gear 3 and the pintles 133 through the center O of the internal gear 21. Wedges 180, freely pivoted on the respective pintles 179, corresponding to the wedges 128 and 138, ride in respective guide slots 182 of a disc 181, perforated at 205, corresponding to the perforated slotted discs 126 and 136. The disc 181 is secured to the low-speed shaft 183, so as to rotate therewith.

The high-speed shaft 155 is shown mounted in a journal bearing 156. The parts are shown held securely in place on the high-speed shaft 155 by a thrust collar 164 that is secured to the high-speed shaft 155 by a screw 165 extending through the collar 164, with a ball bearing 163 interposed. The low-speed shaft 183 is similarly mounted in a journal bearing 68. A thrust collar 186, corresponding to the thrust collar 164, is held in place by a screw 187, with a ball bearing 185 interposed.

As the tire 173 wears away, and as the inner wall of the annulus 153 may also wear away, it may become necessary, from time to time, in order that the pintles 179 may always pass through the center O of the annulus 153, to readjust the position of the wheel 159. Such readjustment may be accomplished in any desired way, as by mounting the screws 175 in elongated slots, not shown, of the arm 174. The illustrated adjustment involves mounting the pintle 160, about which the wheel 159 is freely pivoted, on an eccentric 169 that may be rotatably adjusted by means of a suitable tool inserted into openings 170. The parts may be tightened in eccentrically adjusted position by means of a screw or bolt 204 for clamping together separated arms of the part or element 157 between which the eccentric 169 is received. In this manner, it is possible to maintain always the proper degree of pressure of the tire 173 against the inner wall of the annulus 153. As the tire 173 or the inner wall of the annulus 153 wears down, all that is necessary is to readjust this pressure, by means of the eccentric 169. Such readjustment, even without wearing down, could be utilized also, within limits, to control somewhat the degree of speed reduction.

The counterweight 161 may be adjusted to correspond to the adjustment of the wheel 159. It is mounted upon a bolt 162 that is eccentrically mounted between the separated arms of the element 158 by means of an eccentric 167 similar to the eccentric 169. The openings 168 of the eccentric 167 serve a function similar to that of the openings 170 of the eccentric 169, and a bolt 203 corresponds to the bolt 204.

The tire 173 is held in place on the periphery of the wheel 159 in a peripheral recess that is L-shaped in cross section, as shown in Fig. 24, between the short leg of the L and a metal disc 207 that is secured to the wheel 159 by screws 208. Ball bearings 171 are interposed between the disc 207 and the eccentric 169. Ball bearings 172 are similarly interposed between the other face of the wheel 159 and a nut that is threaded on the free end of the pintle 160.

One of the objects of the present invention has been stated above to reside in varying the speed reduction or increase. According to the specific embodiment of the invention that is herein illustrated and described, this result is attained by adjusting the length of the periphery of the annular gear 153. To this end, the annulus 153 is shown split. A wide range of speed ratios may therefore be attained, during the operation of the machine, merely by increasing or decreasing the circumference of the annulus 153. The range of adjustment may be such, indeed, as to render it possible: first, to stop altogether the rotation of the controlled shaft, whether low-speed or high-speed; and then by continuing the adjustment in the same direction, even to reverse the direction of rotation of the controlled shaft. This continuous adjustment may be effected without interrupting the rotation, at full speed, of the control shaft, whether high-speed or low-speed, respectively.

The split annulus 153 is shown more particularly in Fig. 23 as provided with a tenon 209 at one of its ends for reception in a mortise 210 at its other end. The split annulus 153 is disposed in, and concentrically with, a ring that is shown in Fig. 24 as tightly fitted in a central peripheral recess of the casing of the machine formed between the half-shells 151 and 152. This ring is shown constituted of two parallel symmetrically disposed ring sections 188 and 189 that are held spaced apart by spacing washers 213 mounted about the bolts 154. A number of pivot pins 193, closely spaced along the circumference of the container formed by the half-shells 151 and 152, extend through the ring sections 188 and 189. A clamping cam jaw 192 is pivotally mounted about each pivot pin 193 in the space between the ring sections 188 and 189. The clamping cam jaws 192 are therefore pivoted to the stationary ring constituted of the ring sections 188 and 189.

A similar ring is mounted for relatable adjustment, by means of an adjusting handle 197, outside the container formed by the half-shells 151 and 152. It is constituted of similar ring sections 190 and 191, concentric with the respective ring sections 188 and 189. The ring sections 190 and 191 are provided with pins 194, similar to the pivot pins 193, secured within recesses 195 of the respective clamping cam jaws 192. They are held together by bolts 196 to prevent their separation, and they are held separated by spacing washers 212 mounted on the bolts 196. The clamping cam jaws 192 extend through a space between the half-shells 151 and 152 and into the space between the ring sections 190 and 191.

Upon movement of the adjusting handle 197 in the direction from the full-line to the dotted-line position of Fig. 21, the adjusting ring 190, 191 will be caused to turn in the same direction, whereupon its pins 194 will engage the walls of the recesses 195 of the clamping cam jaws to cause these jaws to compress the split annulus 153. The tenon 209 will be caused to move into the mortise 210, in order to reduce the diameter of the annulus 153. Because the clamping cam jaws 192 are closely spaced, this contraction of the circumference of the annulus 153 will be even and uniform, irrespective of the degree of adjustment, so that the annulus 153 will always have the same center, in all its positions of adjustment. Actuation of the adjusting handle 197 in the opposite direction will result in an equally uniform expansion of the annulus 153. A link 201 connects the annulus 153 with the stationary ring 188, 189 at 201 and 202 to hold it in approximately the same position in all conditions of contraction and expansion. The limits of expansion and contraction are determined by a pin 199, fixed to the ring section 191, that may be actuated between the dotted and the full-line positions of Fig. 21 in which it engages one or the other of two stops 198, held stationary on the container by means of bolts 214.

With this arrangement it is possible, not only to adjust the speed through a wide degree of variation, but also to stop the operation altogether, and also to reverse the direction of rotation, all during the operation of the high-speed shaft at constant high speed.

In Figs. 25 and 26, there is illustrated a simpler method of maintaining the friction wheel 83, corresponding to the wheel 159 of Figs. 21 to 24, in continuous contact with the inner wall of the annulus 72, corresponding to the annulus 153.

According to this simpler construction, no mechanism is required for adjusting for wear. The wheel 83, however, unlike the wheel 159, is shown of radius $r$ somewhat larger than half the radius $R$ of the annulus 72, thus corresponding to the embodiment of the invention illustrated in Figs. 1 to 18 and 31. The wheel 83 is freely pivoted about a pintle 84, corresponding to the pintle 160 of Figs. 21 to 24, mounted on the part 82 of a two-part arm, corresponding to the part 157 of Figs. 21 to 24. The other part 77 of this two-part arm, corresponding to the part 158 of Figs. 21 to 24, is slidably mounted in a longitudinally disposed recess of an arm 76 that is carried by, so as to rotate with, the high-speed shaft 75. This recess is closed at the side facing the low-speed shaft 89 by a plate 80 that is secured to the arm 77 by screws 81. A counterweight 91, corresponding to the counterweights 11, 37 and 161, is shown fixed by a screw 92 to the plate 80. A coil spring 78, mounted in a bore 79 of the part 77, yieldingly forces the two-part arm 77, 82 toward the left, as viewed in Figs. 25 and 26, causing the wheel 83, or any tire that may be mounted thereon, to be maintained yieldingly in frictional engagement with the inner wall of annulus 72 as it rolls therealong. An arm 140, corresponding to the arms 120, 130 and 174, is held to the wheel 83 by screws 141. Guide pins 142 serve a function similar to that of the guide pins 122 and 176. The arm 140 is provided with pintles 143 about which are pivoted wedges 148 that are slidable in guide slots 147 of a disc 146, shown perforated at 149. A leaf spring 144, held intermediately to the arm 140 by a screw 145, performs the function already described in connection with the leaf springs 124, 134 and 177.

As the radius $r$ of the wheel 83 is larger than half the radius $R$ of the annulus 72, each wedge 148 is within the periphery of the wheel 83, the same as the pintle 123 has been described as within the periphery of the external gear 119.

The theory underlying the operation of the embodiment of the invention illustrated in Figs. 25 and 26 is the same as already explained in connection with Figs. 14 to 18 for the embodiment of the invention illustrated in Figs. 1 to 18 and 31. The large dot-and-dash circle of Fig. 14 may represent the stationary annulus 72 instead of the stationary internal gear 3, and the small dot-and-dash circle the rolling wheel 83 instead of the rolling external gear 3. Figs. 14 to 18 may illustrate the circular orbit of the rolling wheel 83 instead of the rolling external gear 119.

The apparatus of the present invention has thus far been described as adapted for the reduction of speed between a high-speed shaft and a low-speed shaft. Especially with a plurality of wedges, as above described, this apparatus is reversible, so as to effect increase of speed from a low-speed shaft to a high-speed shaft. This may be understood, perhaps, by referring to Figs. 1, 2 and 3. Rotation of the shaft 17, if of high speed, would result in the transmission of power to the shaft 5, which would now be of low speed. Reversal of speed may be prevented by means of a ratchet or some similar device. The ratchet is not illustrated, in order not to complicate the drawings further.

When it is desired, in accordance with the present invention, to effect an increase of speed from a low-speed shaft to a high-speed shaft, however, the apparatus shown in Figs. 27 and 28, and illustrated diagrammatically in Fig. 30 may be employed.

The stationary internal gears 3 and 21 and the stationary annuli 153 and 72 are replaced, in the modification of Figs. 28 and 29, by a stationary externally contoured member, shown as an external gear 99. The teeth of the external gear 99 are disposed concentrically with the common axis of the alined high-speed and low-speed shafts. The gear 99 is shown maintained stationary by mounting it upon a projecting stationary shaft 100 that is fixed by a pin 102 in a plate 101 that, in turn, is fixed to a projection 104 of the half-shell 94 by screws 103.

The low-speed shaft is constituted of a sleeve 105 that is mounted to rotate about the stationary shaft 100. It may be driven by a pulley 115, shown keyed at 116 to the low-speed shaft 105, the key 116 being shown held in place by a screw 117.

An external rolling gear 107, meshing with the stationary gear 99, corresponds to the rolling external gears 119 and 27 and the rolling friction gear wheels 159 and 83. It is freely pivoted on a pintle 108 carried by a part 106 projecting to one side of the high-speed shaft 105. The gear member 107, therefore, rotates with the low-speed shaft 105 in a circular orbit about the axis of the alined low-speed and high-speed shafts 105 and 114, in meshing engagement with the gear 99. During the rotation of the low-speed shaft 105, therefore, carrying the external gear 107 in its circular orbit about the axis of the alined shafts 105 and 114, the external gear 107 is caused to rotate about its pintle 108, thus causing the peripheries of the external gears 99 and 107 to engage in rolling contact.

In Fig. 30, the large dot-and-dash circle, of radius $R$, may represent the stationary gear 99, and the small circle, of radius $r$, the rolling gear 107. The common axis of the alined high-speed and low-speed shafts 105 and 114 is represented at $O$. It is assumed that the gears 99 and 107 were initially in tangential contact, with a point $A$ of the periphery of the rolling gear 107 coincident with a point $B$ of the periphery of the stationary gear 99, as indicated by the dot-and-dash lines at the right of Fig. 30. The center $G$ of the gear 107 is initially disposed along the diameter $CB$ of the gear 99 projected, and the gear 107 is assumed to have rolled along the periphery of the gear 99, in response to the anti-clockwise rotation of the low-speed shaft 105, into the position shown. The small circle representing the gear 107, will, therefore, have rotated through an angle $\phi$ while the low-speed shaft 105 has been rotated through the angle $\theta$.

By the time that the gear 107 has become rotated throughout a complete revolution about its pivoting pintle 108, corresponding to which the angle φ equals 360 degrees, the low-speed shaft 105 will have become rotated through more than a half-revolution, making θ equal to more than 180 degrees, and the before-mentioned point A on the periphery of the gear 107 will have reached a point J, beyond the point C. It is immaterial, in this case, whether the radius r of the gear 107 is larger or smaller than half the radius R of the gear 99.

Immovably fixed, as by means of an arm 150, to the gear 107, so as to be rotatable therewith, are pintles 153, each of which is represented in Fig. 30 by the point P. Wedges 158 may be freely pivoted about the pintles 153, and a leaf spring 154 held to the gear 107 by screws 155, will press the wedges 158 into straight-line guide shaped slots 157 of a disc 156, shown perforated at 159, that is fixed to the high-speed shaft 114, so as to rotate therewith about the same alined axes of the high-speed and low-speed shafts 105 and 114. The straight-line guide slots 157 intersect the common axis of these alined shafts and is symmetrically disposed with respect thereto. Assuming, for example, that the low-speed shaft 105 is rotated anti-clockwise, the gear 107, of course, will rotate about its pintle 108 anti-clockwise.

During the rolling movement of the gear 107 along the gear 99, therefore, each pintle 153 and the wedge 158 mounted thereon, travels along an epitrochoidal path. It is necessary, in this case also that each pintle 153 pass through the center O, corresponding to the axis of the alined high-speed and low-speed shafts.

The progressive rotation of the epitrochoidal path of travel of the pin 111 is utilized to increase the low-speed travel of the low-speed shaft 105 to the high-speed travel of the high-speed shaft 114.

The comparatively small angle θ through which the gear 107 has been carried anti-clockwise in its circular orbit has therefore been converted into a comparatively large angle ω of anti-clockwise travel of the disc 156 and the low-speed shaft 114 secured thereto.

As will readily appear from the geometry of Fig. 30, and as may also be proved analytically, the angle ω of rotation of the low-speed shaft is represented by the formula.

$$\omega = \frac{2r+R}{2r} \theta$$

This result may also be obtained from the general formulas above by bearing in mind that $r$ is now negative and that, therefore, $$S = R + 2r$$

since S now represents the distance from the point A to the point P of Fig. 30.

The high-speed shaft 114, therefore, rotates at a speed which is the same as that of the low-speed shaft 105, multiplied by a constant factor greater than unity by a fraction equal to the ratio of the radius R of the fixed gear 99 to the diameter $2r$ of the rolling gear 107.

Further modifications will occur to persons skilled in the art, and all such are considered to fall within the spirit and scope of the invention, as described in the appended claims.

What is claimed is:

1. Apparatus for transferring movement between two relatively movable members one of which is circularly contoured, the said apparatus having, in combination, a member immovable relatively to the contoured member and slidable with respect to the other of the two members, and a further circularly contoured member, one of the circularly contoured members being provided with a peripherally disposed tire, the contoured members being relatively movable with the tire of the said one member in frictional rolling engagement with the periphery of the other contoured member, and the said other of the two members being pivotally movable about a point axially alined with the center of the circular contour of the further member.

2. Apparatus for transferring movement between two relatively movable members one of which is circularly contoured, the said apparatus having, in combination, a member immovable relatively to the contoured member and slidable with respect to the other of the two members, and a further circularly contoured member, the contoured members being relatively movable with their peripheries in frictional rolling engagement, and means for adjusting the degree of frictional rolling engagement, the said other of the two members being pivotally movable about a point axially alined with the center of the circular contour of the further member.

3. Apparatus for transferring movement between two relatively movable members one of which is circularly contoured, the said apparatus having, in combination, a member immovable relatively to the contoured member and slidable with respect to the other of the two members, and a further circularly contoured member, the contoured members being relatively movable with their peripheries in frictional rolling engagement, and means for yieldingly maintaining the said peripheries in rolling engagement, the said other of the two members being pivotally movable about a point axially alined with the center of the circular contour of the further member.

4. Apparatus for transferring movement between two relatively movable members one of which comprises a first circular gear, the said apparatus having, in combination, a second circular gear in gearing engagement with the first circular gear, and a member immovable relatively to the first circular gear and positioned with respect thereto to move relatively to the second circular gear through the axis of the second circular gear during the relative movement of the gears, the other of the two relatively movable members being slidably connected to the relatively immovable member and being pivotally movable about the said axis in response to the relative movement of the gears.

5. Apparatus for transferring movement between two relatively movable members one of which comprises an external circular gear, the said apparatus having, in combination, an internal circular gear in gearing engagement with the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears.

6. Apparatus for transferring movement between two relatively movable members one of which comprises an external circular gear, the said apparatus having, in combination, an internal circular gear the radius of which is approximately double that of the external circular gear in gearing engagement with the external circular gears, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears.

7. Apparatus for transferring movement between two relatively movable members one of which comprises an external circular gear, the said apparatus having, in combination, an internal circular gear the radius of which is approximately double that of the external circular gear in gearing engagement with the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears in order that the relatively immovable member may describe a hypotrochoidal path through the said axis.

8. Apparatus for transferring movement between two relatively movable members one of which comprises an external circular gear, the said apparatus having, in combination, an internal circular gear the radius of which is slightly less than double that of the external circular gear in gearing engagement with the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears in order that the relatively immovable member may describe a hypotrochoidal path through the said axis.

9. Apparatus for transferring movement between two relatively movable members one of which comprises an external circular gear, the said apparatus having, in combination, an internal circular gear the radius of which is slightly more than double that of the external circular gear in gearing engagement with the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears in order that the relatively immovable member may describe a hypotrochoidal path through the said axis.

10. Apparatus for transferring movement between two relatively movable members one of which comprises a first circular gear provided with gear teeth, the said apparatus having, in combination, a second circular gear provided with gear teeth meshing with the gear teeth of the first circular gear, and a member immovable relatively to the second circular gear and positioned with respect thereto to move relatively to the first circular gear through the axis of the first circular gear during the relative movement of the gears, the other of the two relatively movable members being slidably connected to the relatively immovable member and being pivotally movable about the said axis in response to the relative movement of the gears.

11. Apparatus for transferring movement between two relatively movable members one of which comprises an external circular gear provided with externally disposed gear teeth, the said apparatus having, in combination, an internal circular gear provided with internally disposed gear teeth meshing with the gear teeth of the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears.

12. Apparatus for transferring movement between two relatively movable members one of which comprises an external circular gear provided with externally disposed gear teeth, the said apparatus having, in combination, an internal circular gear the radius of which is approximately double that of the external circular gear provided with internally disposed gear teeth meshing with the gear teeth of the external circular gear, and a member immovable relatively to the external circular gear and positioned with respect thereto to move relatively to the internal circular gear through the axis of the internal circular gear during the relative movement of the gears, the other of the two relatively movable members being slidably connected to the relatively immovable member and being pivotally movable about the said axis in response to the relative movement of the gears.

13. Apparatus for transferring movement between two relatively movable members one of which comprises a first circular friction gear, the said apparatus having, in combination, a second circular friction gear in frictional gearing engagement with the first circular friction gear, and a member immovable relatively to the first circular friction gear and positioned with respect thereto to move relatively to the second circular friction gear through the axis of the second circular friction gear during the relative movement of the gears, the other of the two relatively movable members being slidably connected to the relatively immovable member and being pivotally movable about the said axis in response to the relative movement of the gears.

14. Apparatus for transferring movement between two relatively movable members one of which comprises an external circular friction gear, the said apparatus having, in combination, an internal circular friction gear in friction gearing engagement with the external circular friction gear, and a member immovable relatively to the external circular friction gear and positioned with respect thereto to move relatively to the internal circular friction gear through the axis of the internal circular friction gear during the relative movement of the gears, the other of the two relatively movable members being slidably connected with the relatively immovable member and being pivotally movable about the said axis in response to the relative movement of the gears.

15. Apparatus for transferring movement between high-speed and low-speed shafts having, in combination, a first gear, means connecting the first gear with the high-speed shaft to cause it to rotate with the high-speed shaft in an orbit about the high-speed shaft, a second gear in gearing engagement with the first gear, a member immovable relatively to the first gear and positioned with respect thereto to move relatively to the second gear through the axis of the high-speed shaft during the relative movement of the gears, and a member rotatable with the low-speed shaft slidably connected to the relatively immovable member.

16. Apparatus for transferring movement between alined high-speed and low-speed shafts having, in combination, a movable circular gear, means connecting the movable circular gear to cause it to rotate with the high-speed shaft in a circular orbit about the high-speed shaft, a stationary circular gear in gearing engagement with the movable circular gear concentric with the axis of the alined shafts, a member movable with the movable circular gear and positioned with respect thereto to move through the said axis during the relative movement of the gears, and a member rotatable with the low-speed shaft slidably connected to the relatively immovable member.

17. Apparatus for transferring movement between alined high-speed and low-speed shafts having, in combination, an external circular gear, means connecting the external circular gear to cause it to rotate with the high-speed shaft in a circular orbit about the high-speed shaft, a stationary internal circular gear in gearing engagement with the external circular gear concentric with the axis of the alined shafts, a member movable with the external circular gear and positioned with respect thereto to move through the said axis during the movement of the external circular gear, and a member rotatable with the low-speed shaft slidably connected to the first-named member.

18. Apparatus for transferring movement between alined high-speed and low-speed shafts having, in combination, a movable external circular gear, means connecting the external circular gear to cause it to rotate with the high-speed shaft in a circular orbit about the high-speed shaft, a stationary internal circular gear the radius of which is approximately double that of the external circular gear in gearing engagement with the external circular gear concentric with the axis of the alined shafts, a member movable with the external circular gear and positioned with respect thereto to move through the said axis during the movement of the external circular gear, and a member rotatable with the low-speed shaft slidably connected to the first-named member.

19. Speed-reducing apparaus having, in combination, an external gear, an internal gear in gearing engagement with the external gear, a member immovable relatively to the external gear and positioned with respect thereto to move relatively to the internal gear through the axis of the internal gear during the relative movement of the gears, and a member slidably connected to the relatively immovable member and pivotally movable about the said axis in response to the relative movement of the gears.

20. Speed-reducing apparatus having, in combination, a movable external circular gear, a stationary internal circular gear in gearing engagement with the external circular gear, a member movable with the external circular gear and positioned with respect thereto to move through the axis of the internal circular gear during the movement of the external circular gear, and a member slidably connected to the first-named member and pivotally movable about the said axis in response to the movement of the external circular gear.

21. Speed-reducing apparatus having, in combination, an external gear provided with externally disposed gear teeth, an internal gear provided with internally disposed gear teeth meshing with the gear teeth of the external gear, a member immovable relatively to the external gear and positioned with respect thereto to move relatively to the internal gear through the axis of the internal gear during the relative movement of the gears, and a member slidably connected to the relatively immovable member and pivotally movable about the said axis in response to the relative movement of the gears.

22. Speed-reducing apparatus having, in combination, a movable external circular gear provided with externally disposed gear teeth, a stationary internal circular gear provided with internally disposed gear teeth meshing with the gear teeth of the external circular gear, a member movable with the external circular gear and positioned with respect thereto to move through the axis of the internal circular gear during the movement of the external circular gear, and a member slidably connected to the first-named member and pivotally movable about the said axis in response to the movement of the external circular gear.

23. Speed-reducing apparatus having, in combination, an external circular friction gear, an internal circular friction gear in frictional gearing engagement with the external circular friction gear, a member immovable relatively to the external circular friction gear and positioned with respect thereto to move relatively to the internal circular friction gear through the axis of the internal circular friction gear during the relative movement of the gears, and a member slidably connected to the relatively immovable member and pivotally movable about the said axis in response to the relative movement of the gears.

24. Apparatus for reducing speed between alined high-speed and low-speed shafts having, in combination, an external circular gear, means connecting the external circular gear with the high-speed shaft to cause it to rotate with the high-speed shaft in a circular orbit about the axis of the alined shafts, an internal circular gear in gearing engagement with the external circular gear concentric with the said axis, a member immovable relatively to the external circular gear and positioned with respect thereto to move relatively to the internal circular gear through the said axis during the relative movement of the gears, and a member rotatable with the low-speed shaft slidably connected to the relatively immovable member.

25. Apparatus for reducing speed between alined high-speed and low-speed shafts having, in combination, a movable external circular gear, means connecting the external circular gear with the high-speed shaft to cause it to rotate with the high-speed shaft in a circular orbit about the axis of the alined shafts, a stationary internal circular gear in gearing engagement with the external circular gear concentric with the said axis, a member movable with the external circular gear and positioned with respect thereto to move through the said axis during the movement of the external circular gear, and a member rotatable with the low-speed shaft slidably connected to the first-named member.

26. Apparatus for reducing speed between alined high-speed and low-speed shafts having, in combination, an external circular gear provided with externally disposed gear teeth, means connecting the external circular gear with the high-speed shaft to cause it to rotate with the high-speed shaft in a circular orbit about the axis of the alined shafts, an internal circular gear provided with internally disposed gear teeth meshing with the gear teeth of the external circular gear concentric with the said axis, a member immovable relatively to the external circular gear and positioned with respect thereto to move relatively to the internal circular gear through the said axis during the relative movement of the gears, and a member rotatable with the low-speed shaft slidably connected to the relatively immovable member.

27. Apparatus for reducing speed between alined high-speed and low-speed shafts having, in combination, a movable external circular gear provided with externally disposed gear teeth, means connecting the external circular gear with the high-speed shaft to cause it to rotate with the high-speed shaft in a circular orbit about the axis of the alined shafts, a stationary internal circular gear provided with internally disposed gear teeth meshing with the gear teeth of the external circular gear concentric with the said axis, a member movable with the external circular gear and positioned with respect thereto to move through the said axis during the movement of the external circular gear, and a member rotatable with the low-speed shaft slidably connected to the first-named member.

28. Apparatus for reducing speed between alined high-speed and low-speed shafts having, in combination, a movable external circular gear provided with externally disposed gear teeth, means connecting the external circular gear with one of the shafts to cause it to rotate with the said one shaft in a circular orbit about the axis of the alined shafts, a stationary circular gear provided with gear teeth meshing with the gear teeth of the external circular gear concentric with the said axis, a member movable with the external circular gear and positioned with respect thereto to move through the said axis during the movement of the external circular gear, and a member rotatable with the other shaft slidably connected to the first-named member.

29. Apparatus for reducing speed between alined high-speed and low-speed shafts having, in combination, an external circular gear provided with externally disposed gear teeth, means connecting the external circular gear with the high-speed shaft to cause it to rotate with the high-speed shaft in a circular orbit about the axis of the alined shafts, an internal circular gear provided with internally disposed gear teeth meshing with the gear teeth of the external circular gear concentric with the said axis, the high-speed shaft having a gear provided with gear teeth also meshing with the gear teeth of the external circular gear, a member immovable relatively to the external circular gear and positioned with respect thereto to move relatively to the internal circular gear through the said axis during the relative movement of the gears, and a member rotatable with the low-speed shaft slidably connected to the relatively immovable member.

30. Speed-increasing apparatus having, in combination, a first external gear, a second external gear in gearing engagement with the first external gear, a member immovable relatively to the first gear and positioned with respect thereto to move relatively to the second gear through the axis of the second gear during the relative movement of the gears, and a member slidably connected to the relatively immovable member and pivotally movable about the said axis in response to the relative movement of the gears.

31. Speed-increasing apparatus having, in combination, a first external circular gear, a second external circular gear in gearing engagement with the first circular gear, a member immovable relatively to the first circular gear and positioned with respect thereto to move relatively to the second circular gear through the axis of the second circular gear during the relative movement of the gears, and a member slidably connected to the relatively immovable member and pivotally movable about the said axis in response to the relative movement of the gears.

32. Speed-increasing apparatus having, in combination, a movable external circular gear, a stationary external circular gear in gearing engagement with the movable circular gear, a member movable with the movable circular gear and positioned with respect thereto to move through the axis of the stationary circular gear during the movement of the movable circular gear, and a member slidably connected to the first-named member and pivotally movable about the said axis in response to the movement of the movable circular gear.

33. Speed-increasing apparatus having, in combination, a first external gear provided with externally disposed gear teeth, a second external gear provided with externally disposed gear teeth meshing with the gear teeth of the first gear, a member immovable relatively to the first gear and positioned with respect thereto to move relatively to the second gear through the axis of the second gear during the relative movement of the gears, and a member slidably connected to the relatively immovable member and pivotally movable about the said axis in response to the relative movement of the gears.

34. Speed-increasing apparatus having, in combination, a first external circular gear provided with externally disposed gear teeth, a second external circular gear provided with externally disposed gear teeth meshing with the gear teeth of the first gear, a member immovable relatively to the first gear and positioned with respect thereto to move relatively to the second gear through the axis of the second gear during the relative movement of the gears, and a member slidably connected to the relatively immovable member and pivotally movable about the said axis in response to the relative movement of the gears.

35. Speed-increasing apparatus having, in combination, a movable external circular gear provided with externally disposed gear teeth, a stationary external circular gear provided with externally disposed gear teeth meshing with the gear teeth of the movable circular gear, a member movable with the movable circular gear and positioned with respect thereto to move through the axis of the stationary circular gear during the movement of the movable circular gear, and a member slidably connected to the first-named member and pivotally movable about the said axis in response to the movement of the movable circular gear.

36. Apparatus for increasing speed between alined high-speed and low-speed shafts having, in combination, a first external circular gear, means connecting the first circular gear with the low-speed shaft to cause it to rotate with the low-speed shaft in a circular orbit about the axis of the alined shafts, a second external circular gear in gearing engagement with the first circular gear concentric with the said axis, a member immovable relatively to the first circular gear and positioned with respect thereto to move relatively to the second circular gear through the said axis during the relative movement of the gears, and a member rotatable with the high-speed shaft slidably connected to the relatively immovable member.

37. Apparatus for increasing speed between alined high-speed and low-speed shafts having, in combination, a movable external circular gear, means connecting the movable circular gear with the low-speed shaft to cause it to rotate with the low-speed shaft in a circular orbit about the axis of the alined shafts, a stationary external circular gear in gearing engagement with the movable circular gear concentric with the said axis, a member movable with the movable circular gear and positioned with respect thereto to move through the said axis during the movement of the movable circular gear, and a member rotatable with the high-speed shaft slidably connected to the first-named member.

38. Apparatus for increasing speed between alined high-speed and low-speed shafts having, in combination, a first external circular gear provided with externally disposed gear teeth, means connecting the first circular gear with the low-speed shaft to cause it to rotate with the low-speed shaft in a circular orbit about the axis of the alined shafts, a second external circular gear provided with externally disposed gear teeth meshing with the gear teeth of the first circular gear concentric with the said axis, a member immovable relatively to the first circular gear and positioned with respect thereto to move relatively to the second circular gear through the said axis during the relative movement of the gears, and a member rotatable with the high-speed shaft slidably connected to the relatively immovable member.

39. Apparatus for increasing speed between alined high-speed and low-speed shafts having, in combination, a movable external circular gear provided with externally disposed gear teeth, means connecting the movable circular gear with the low-speed shaft to cause it to rotate with the low-speed shaft in a circular orbit about the axis of the alined shafts, a stationary external circular gear provided with externally disposed gear teeth meshing with the gear teeth of the movable circular gear concentric with the said axis, a member movable with the movable circular gear and positioned with respect thereto to move through the said axis during the relative movement of the movable circular gears, and a member rotatable with the high-speed shaft slidably connected to the first-named member.

40. Apparatus for transferring speed between alined high-speed and low-speed shafts having, in combination, a movable external circular gear, means connecting the movable circular gear with one of the shafts to cause it to rotate with the said one shaft in a circular orbit about the axis of the alined shafts, a stationary circular gear in gearing engagement with the movable circular gear concentric with the said axis, a member movable with the movable circular gear and positioned with respect thereto to move through the said axis during the movement of the movable circular gear, and a member rotatable with the other shaft slidably connected to the first-named member.

41. Speed-transferring apparatus having, in combination, a first gear, a second gear in gearing engagement with the first gear, a member immovable relatively to the first gear and positioned with respect thereto to move relatively to the second gear through the axis of the second gear during the relative movement of the gears, and a member slidably connected to the relatively immovable member and pivotally movable about the said axis in response to the relative movement of the gears.

42. Apparatus for transferring movement between two relatively movable members one of which comprises a first circular gear, the said apparatus having, in combination, a second circular gear in gearing engagement with the first circular gear, a member immovable relatively to the first circular gear and positioned with respect thereto to move relatively to the second circular gear through the axis of the second circular gear during the relative movement of the gears, the other of the two relatively movable members being slidably connected to the relatively immovable member and being pivotally movable about the said axis in response to the relative movement of the gears, and means for adjusting the length of the periphery of one of the gears.

43. Apparatus for transferring movement between high-speed and low-speed shafts having, in combination, a first gear, means connecting the first gear with the high-speed shaft to cause it to rotate with the high-speed shaft in an orbit about the high-speed shaft, a second gear in gearing engagement with the first gear, a member immovable relatively to the first gear and positioned with respect thereto to move relatively to the second gear through the axis of the high-speed shaft during the relative movement of the gears, a member rotatable with the low-speed shaft slidably connected to the relatively immovable member, and means for adjusting the length of the periphery of one of the gears.

44. Apparatus for transferring movement between two relatively movable members one of which comprises a first circular gear, the said apparatus having, in combination, a second circular gear in gearing engagement with the first circular gear, and a member immovable relatively to the first circular gear and positioned with respect thereto to move relatively to the second circular gear through the axis of the second circular gear during the relative movement of the gears, the other of the two relatively movable members being slidably connected to the relatively immovable member and being pivotally movable about the said axis in response to the relative movement of the gears, one of the gears comprising an adjustable split annulus.

45. Apparatus for transferring movement between high-speed and low-speed shafts having, in combination, a first gear, means connecting the first gear with the high-speed shaft to cause it to rotate with the high-speed shaft in an orbit about the high-speed shaft, a second gear in gearing engagement with the first gear, a member immovable relatively to the first gear and positioned with respect thereto to move relatively to the second gear through the axis of the high-speed shaft during the relative movement of the gears, and a member rotatable with the low-speed shaft slidably connected to the relatively immovable member, one of the gears comprising an adjustable split annulus.

46. Apparatus for transferring movement between high-speed and low-speed shafts having, in combination, a first gear, means connecting the first gear with the high-speed shaft to cause it to rotate with the high-speed shaft in an orbit about the high-speed shaft, a stationary circular ring, an adjustable circular ring concentric with the stationary ring, a plurality of cams pivoted upon the stationary ring and slidably connected with the adjustable ring, a split annulus gear concentric with the rings in gearing engagement with the first gear, a member immovable relatively to the first gear and positioned with respect thereto to move relative to the annulus gear through the axis of the high-speed shaft during the relative movement of the gears, a member rotatable with the low-speed shaft slidably connected to the relatively immovable member, and means for adjusting the adjustable circular ring about its center to cause the cams to adjust the annulus gear in order to vary its diameter.

47. Apparatus for transferring movement between high-speed and low-speed shafts having, in combination, a first gear, means connecting the first gear with the high-speed shaft to cause it to rotate with the high-speed shaft in an orbit about the high-speed shaft, a stationary circular ring, two parallel adjustable rings concentric with the stationary ring disposed exterior to the stationary ring, a plurality of cams pivoted upon the stationary ring and slidably connected to the adjustable rings, a split annulus gear concentric with the rings disposed within the cam rings in gearing engagement with the first gear, a member immovable relative to the first gear and positioned with respect thereto to slide relative to the annulus gear through the axis of the high-speed shaft during the relative movement of the gears, and means for adjusting the adjustable rings as a unit about their center to cause the cams to adjust the annulus gear in order to vary its diameter.

48. Apparatus for transferring movement between two relatively movable members one of which comprises a circular gear, the said apparatus having, in combination, a second circular gear in gearing engagement with the first circular gear, and a plurality of members immovable relatively to the first circular gear and positioned with respect thereto to move relatively to the second circular gear along different paths through the axis of the second circular gear during the relative movement of the gears, the other of the two relatively movable members being slidably connected to the relatively immovable member and being pivotally movable about the said axis in response to the relative movement of the gears.

49. Apparatus for transferring movement between high-speed and low-speed shafts having, in combination, a first gear, means connecting the first gear with the high-speed shaft to cause it to rotate with the high-speed shaft in an orbit about the high-speed shaft, a second gear in gearing engagement with the first gear, a plurality of members immovable relatively to the first gear and positioned with respect thereto to move along different paths relatively to the second gear through the axis of the high-speed shaft during the relative movement of the gears, and a member rotatable with the low-speed shaft slidably connected to the relatively immovable member.

50. Apparatus for transferring movement between two relatively movable members, one of which comprises one or more circular gears, the said apparatus having, in combination, a further circular gear in gearing engagement with the one or more circular gears, and a plurality of members respectively immovable relatively to the respective one or more second circular gears and positioned with respect thereto to move relatively to the further circular gear along different paths through the axis of the further circular gears during the relative movement of the gears, the other of the two relatively movable members being slidably connected to the relatively immovable member and being pivotally movable about the said axis in response to the relative movement of the gears.

51. Apparatus for transferring movement between high-speed and low-speed shafts having, in combination one or more gears, means connecting the one or more gears to the high-speed shaft to cause the one or more gears to rotate with the high-speed shaft in an orbit about the high-speed shaft, a further gear in gearing engagement with the one or more gears, a plurality of members immovable relatively to the one or more gears and positioned with respect thereto to move along different paths relatively to the further gear through the axis of the high-speed shaft during the relative movement of the gears, and a member rotatable with the low-speed shaft slidably connected to the relatively immovable member.

EMERSON T. OLIVER.

No references cited.